(12) United States Patent
Ise et al.

(10) Patent No.: US 11,044,392 B2
(45) Date of Patent: Jun. 22, 2021

(54) ELECTRONIC APPARATUS, METHOD FOR CONTROLLING SAME, ENABLING A USER TO EASILY IDENTIFY THE AMOUNT OF ZOOMING OPERATION

(71) Applicant: CANON KABUSHIKI KAISHA, Tokyo (JP)

(72) Inventors: Toshimichi Ise, Yokohama (JP); Koichi Okada, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 16/246,126

(22) Filed: Jan. 11, 2019

(65) Prior Publication Data
US 2019/0220102 A1 Jul. 18, 2019

(30) Foreign Application Priority Data

Jan. 15, 2018 (JP) .............................. JP2018-004458
Jan. 15, 2018 (JP) .............................. JP2018-004498

(51) Int. Cl.
*H04N 5/232* (2006.01)
*G06F 3/0484* (2013.01)
(Continued)

(52) U.S. Cl.
CPC ......... *H04N 5/23216* (2013.01); *G06F 3/023* (2013.01); *G06F 3/048* (2013.01);
(Continued)

(58) Field of Classification Search
CPC ............... H04N 5/23216; H04N 5/232; H04N 5/23212; G06F 3/04847; G06F 3/023; G06F 3/048; G06F 2203/04806
See application file for complete search history.

(56) References Cited

U.S. PATENT DOCUMENTS 4,945,371 A 7/1990 Hashimoto
5,570,236 A * 10/1996 Hirasawa ............... G02B 7/105
                                                              348/345
(Continued)

FOREIGN PATENT DOCUMENTS

CN      101296320 A    10/2008
CN      101483717 A    7/2009
(Continued)

OTHER PUBLICATIONS

Yingming, Z., et al. "Design of 10x infrared zoom lens with all sphere surfaces," Journal of Applied Optics, May 2016, pp. 465-470, vol. 37, No. 3.

*Primary Examiner* — Luong T Nguyen
(74) *Attorney, Agent, or Firm* — Canon U.S.A., Inc., IP Division

(57) ABSTRACT

Processing content is assigned and set for each of a plurality of levels of an amount of operation on a specific operation member. In response to a user operation made on the specific operation member, processing content set for a level corresponding to the amount of operation of the user operation is executed. A setting screen for assigning the processing content to be set to each of the plurality of levels of the amount of operation on the specific operation member based on a setting operation by a user is displayed. In response to a user operation made on the specific member while the setting screen is displayed, a display indicating the amount of operation of the user operation is provided.

15 Claims, 18 Drawing Sheets

(51) Int. Cl.
*G06F 3/023* (2006.01)
*G06F 3/048* (2013.01)

(52) U.S. Cl.
CPC ......... *G06F 3/04847* (2013.01); *H04N 5/232* (2013.01); *G06F 2203/04806* (2013.01)

(56) References Cited

U.S. PATENT DOCUMENTS

| | | | | |
|---|---|---|---|---|
| 6,035,137 | A | * | 3/2000 | Kaneko .................. G02B 7/10 396/76 |
| 6,512,542 | B1 | | 1/2003 | Kaneko |
| 6,897,896 | B1 | * | 5/2005 | Mizumura ....... H04N 5/232933 348/240.3 |
| 2012/0274832 | A1 | | 11/2012 | Hitosuga |
| 2015/0256759 | A1 | | 9/2015 | Yoshino |
| 2016/0191806 | A1 | * | 6/2016 | Yamaguchi ......... G06F 3/04842 348/333.02 |

FOREIGN PATENT DOCUMENTS

| | | | |
|---|---|---|---|
| CN | 101848338 | A | 9/2010 |
| CN | 102158647 | A | 8/2011 |
| CN | 104079733 | A | 10/2014 |
| CN | 106412418 | A | 2/2017 |
| CN | 106572296 | A | 4/2017 |
| CN | 107105132 | A | 8/2017 |
| JP | 2009-171192 | A | 7/2009 |
| JP | 2010-56972 | A | 3/2010 |

* cited by examiner

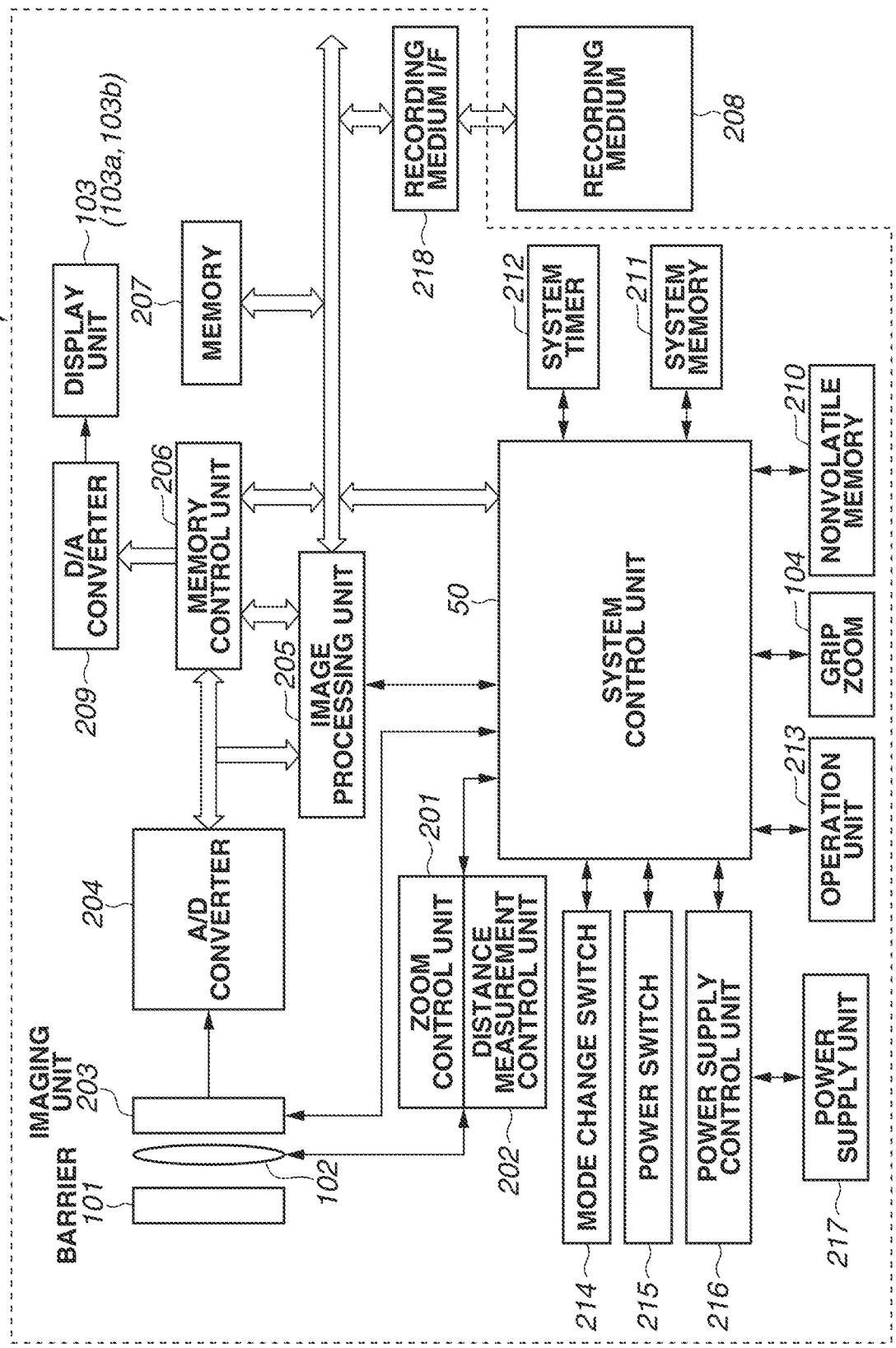

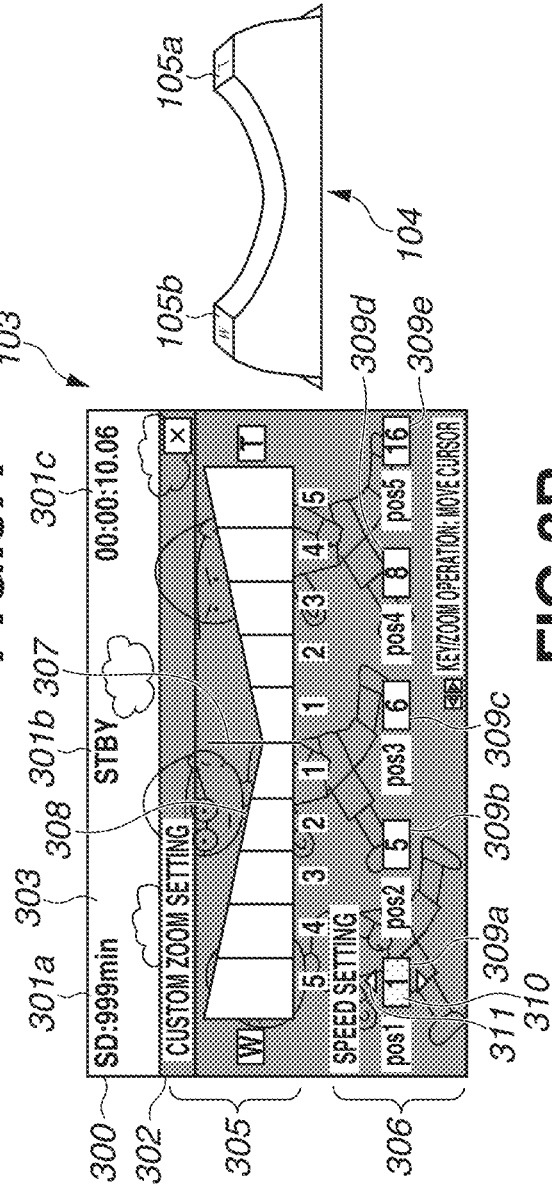
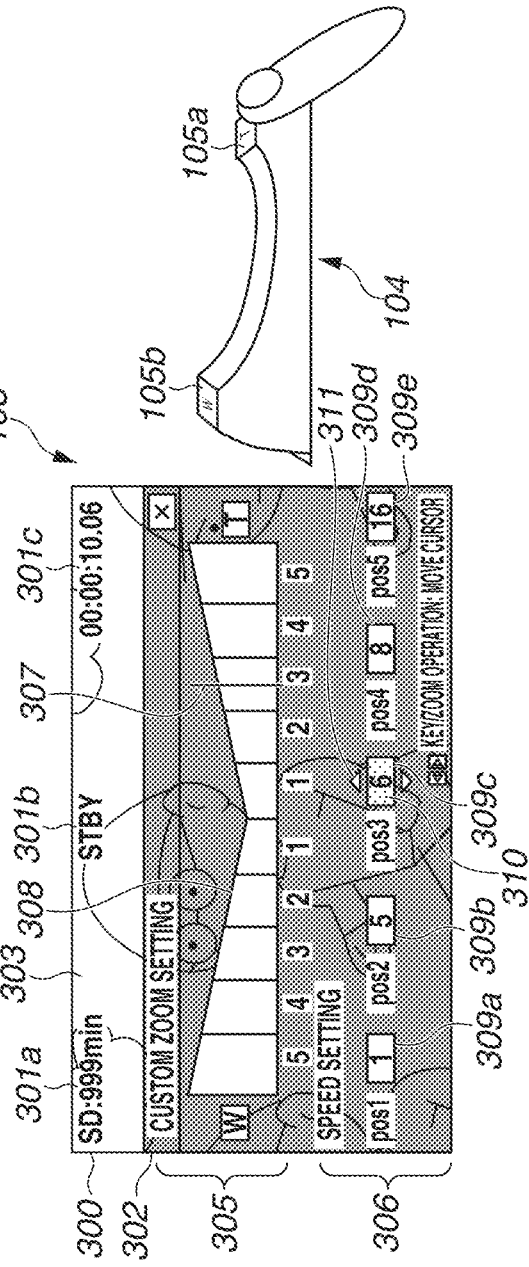

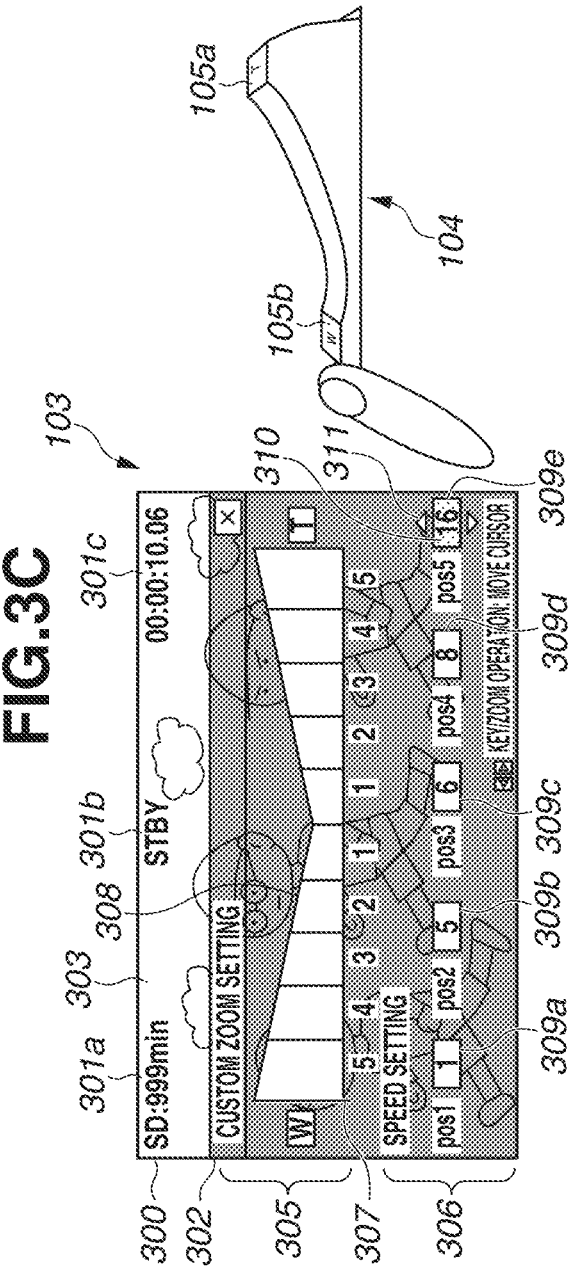

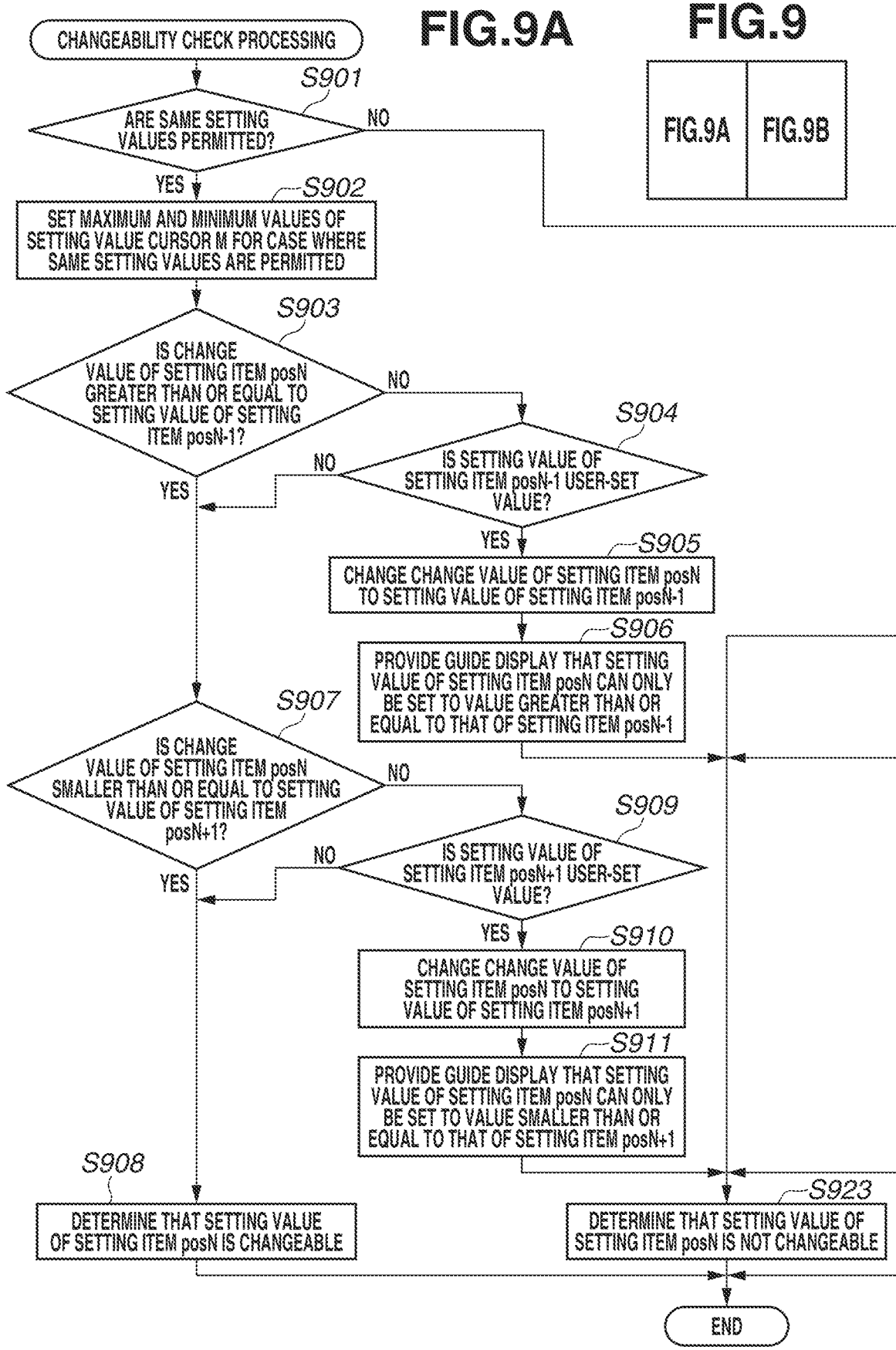

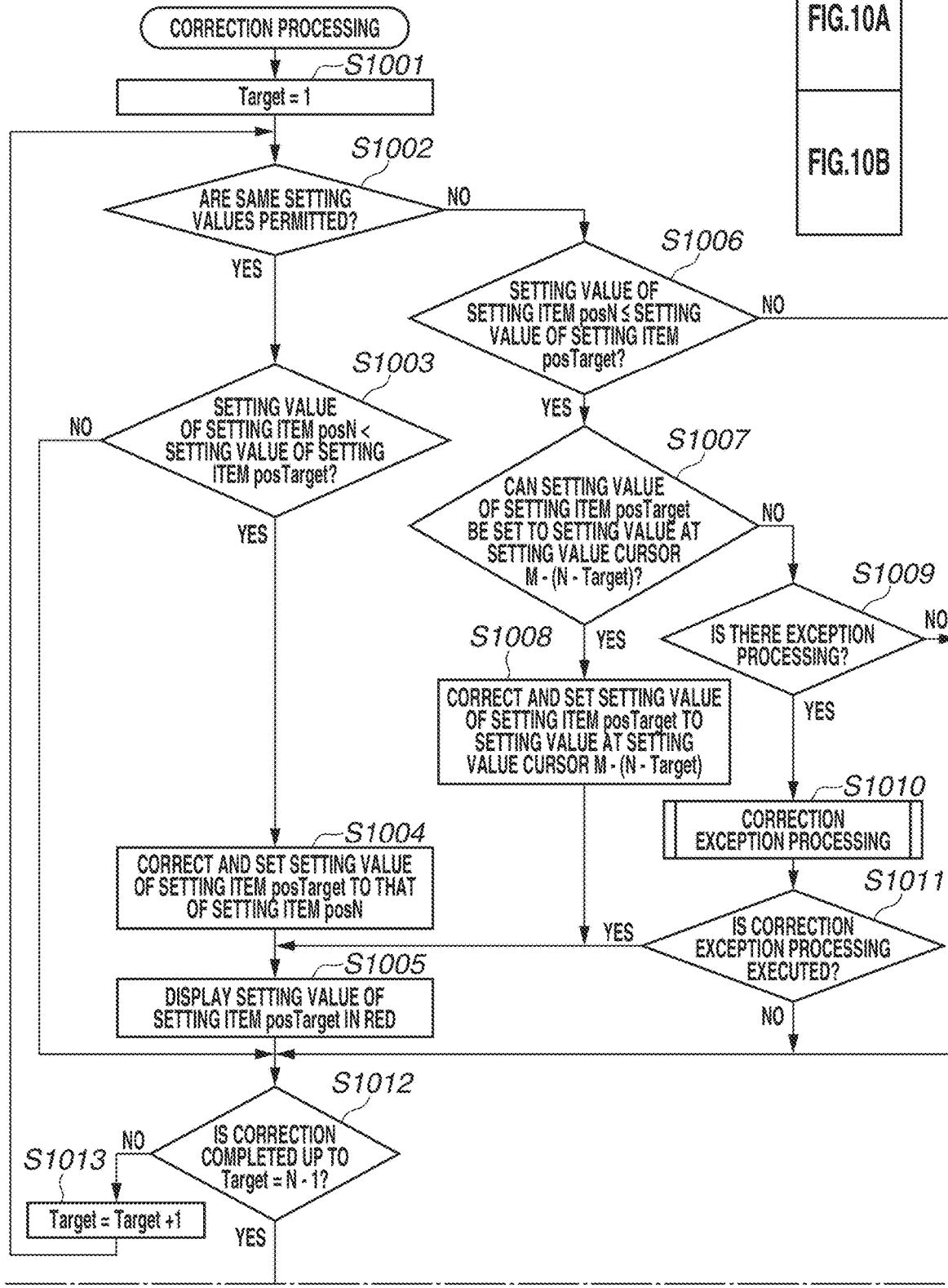

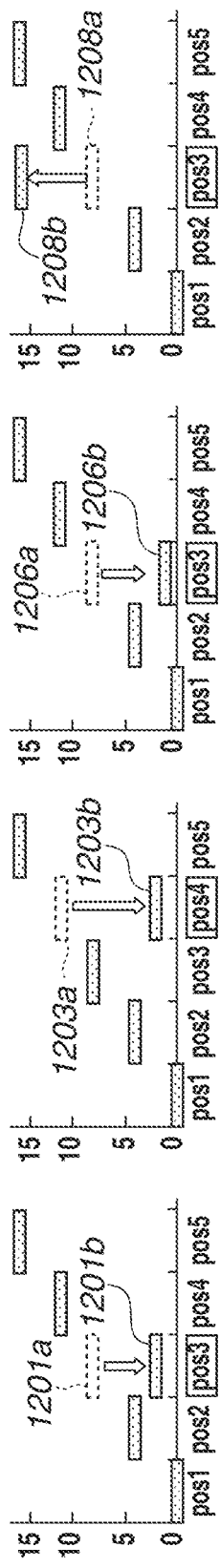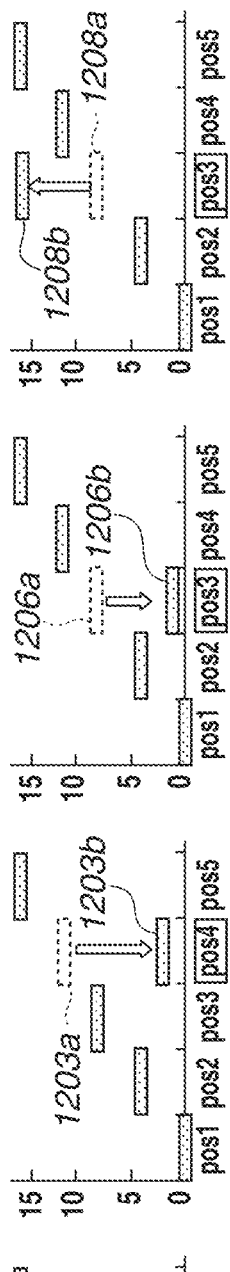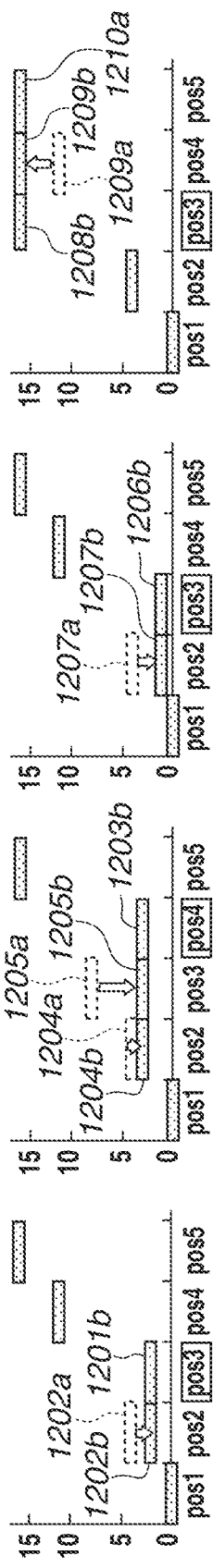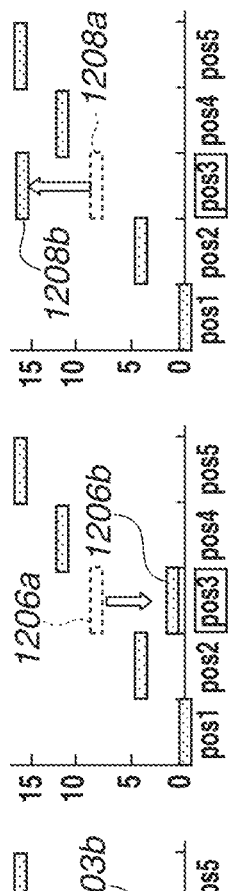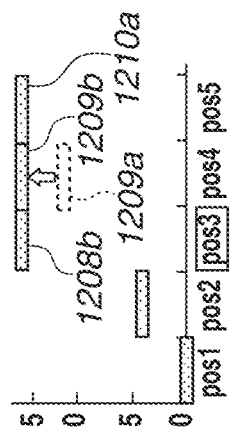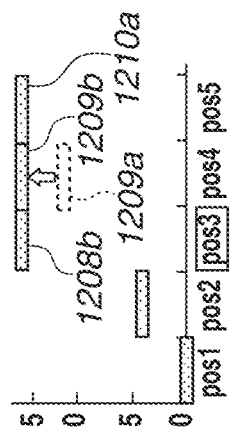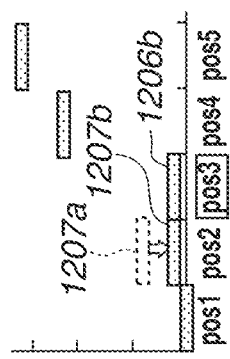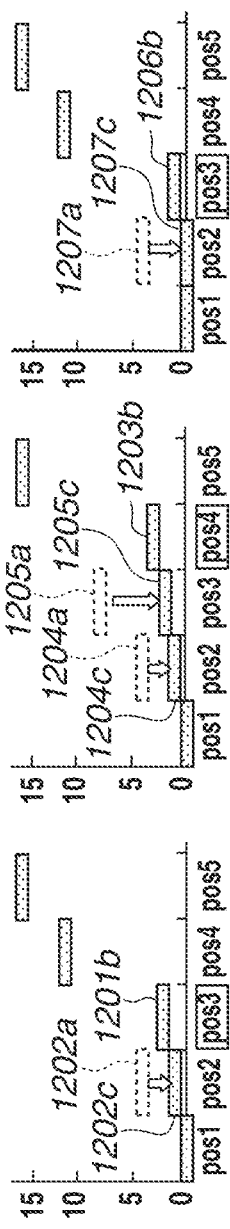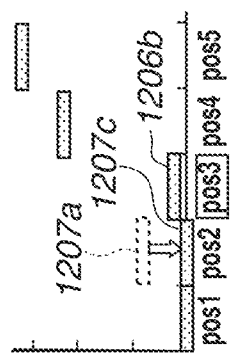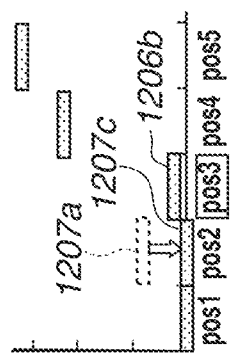

ELECTRONIC APPARATUS, METHOD FOR CONTROLLING SAME, ENABLING A USER TO EASILY IDENTIFY THE AMOUNT OF ZOOMING OPERATION

BACKGROUND OF THE INVENTION

Field of the Invention

The present invention relates to an electronic apparatus in which content to be executed based on an operation of an operation member can be customized by a user, a method for controlling the same, and a program.

Description of the Related Art

An apparatus that executes a function based on an amount of operation on an operation member has been discussed. Japanese Patent Application Laid-Open No. 2010-56972 discusses a portable electronic apparatus that executes an assigned function based on an angle of rotation caused by an operation on a rotatable rotation member with respect to an initial position.

An apparatus that sets smooth values for a predetermined parameter has also been discussed. Japanese Patent Application Laid-Open No. 2009-171192 discusses a display apparatus that can set a gamma characteristic, i.e., an image quality setting parameter of a video image, and renders the set gamma curve smooth by curve correction.

According to Japanese Patent Application Laid-Open No. 2010-56972, functions corresponding to different amounts of operation are assigned in advance. According to such a technique, an operation by the user immediately results in execution of a function. The user therefore has difficultly in trying out the amounts of operation to execute the respective functions, and the amounts of operation are difficult to identify.

In an apparatus in which parameters of setting items can be set by the user, like Japanese Patent Application Laid-Open No. 2009-171192, the setting of a parameter can change a relationship with other setting items in terms of magnitude. In such a case the apparatus can fail to provide the user-desired function.

SUMMARY OF THE INVENTION

The present invention is directed to at least one of the following aspects. One is to enable the user to easily identify the amount of operation. The other is to prevent magnitude setting items from being set to erroneous setting values.

According to an aspect of the present invention, an electronic apparatus includes a memory and at least one processor and/or at least one circuit to perform the operations of the following units: a control unit configured to control, in response to a user operating an operation member having a plurality of selectable operation levels associated with a respective control setting, the electronic apparatus according to the control setting associated with a selected operation level, a setting unit configured to assign a control setting to one or more of the operation levels of the operation member, and a display control unit configured to (i) display a setting screen for setting, based on a setting instruction from a user, one or more control settings to be assigned by the setting unit, and (ii) display, in response to a user operating the operation member while the setting screen is displayed, an indicator on the setting screen to show the operation level that is being selected by the operation of the operation member.

Further features, aspects and advantages of the present invention will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

BRIEF DESCRIPTION OF THE DRAWINGS

FIGS. 3A to 3E illustrate illustrating an example of a custom zoom setting screen and an operation condition.

FIGS. 9A and 9B are flowcharts of changeability check processing.

FIGS. 10A and 10B are flowcharts of correction processing.

FIGS. 12A to 12K are diagrams for explaining examples of correction of setting values.

DESCRIPTION OF THE EMBODIMENTS

Exemplary embodiments of the present invention will be described in detail below with reference to the accompanying drawings.

It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

A first exemplary embodiment describes a case in which an electronic apparatus is a digital video camera 10 (hereinafter, referred to as a camera 10). The camera 10 according to the present exemplary embodiment functions as a display control apparatus.

Figure 1A:
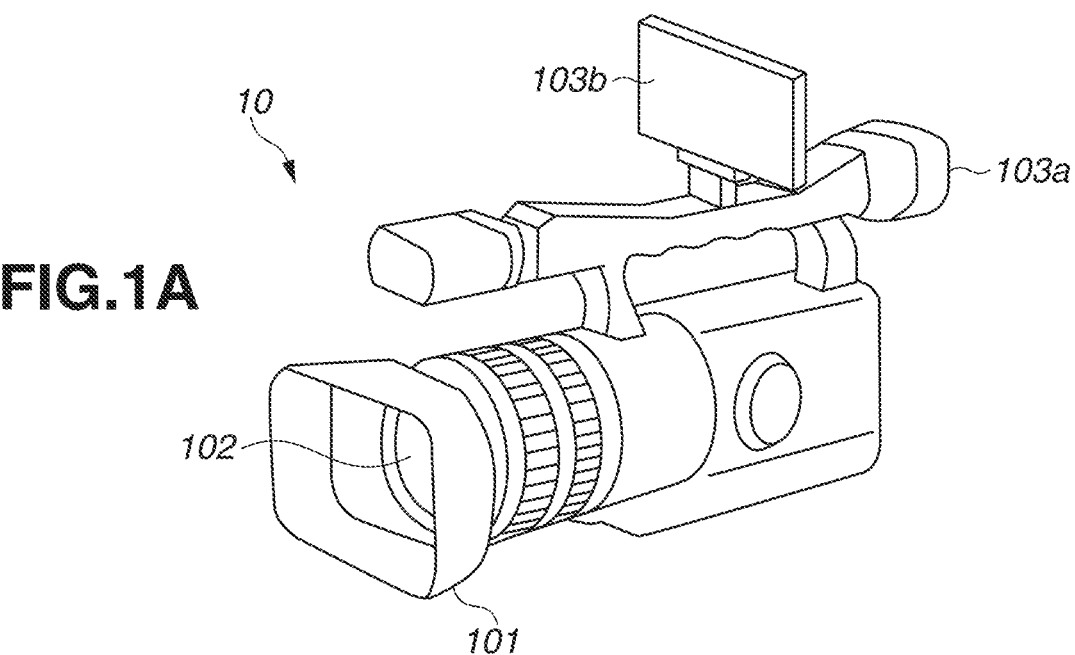
FIGS. 1A to 1C illustrate an external configuration of a camera according to a first exemplary embodiment.
Figure 1B:
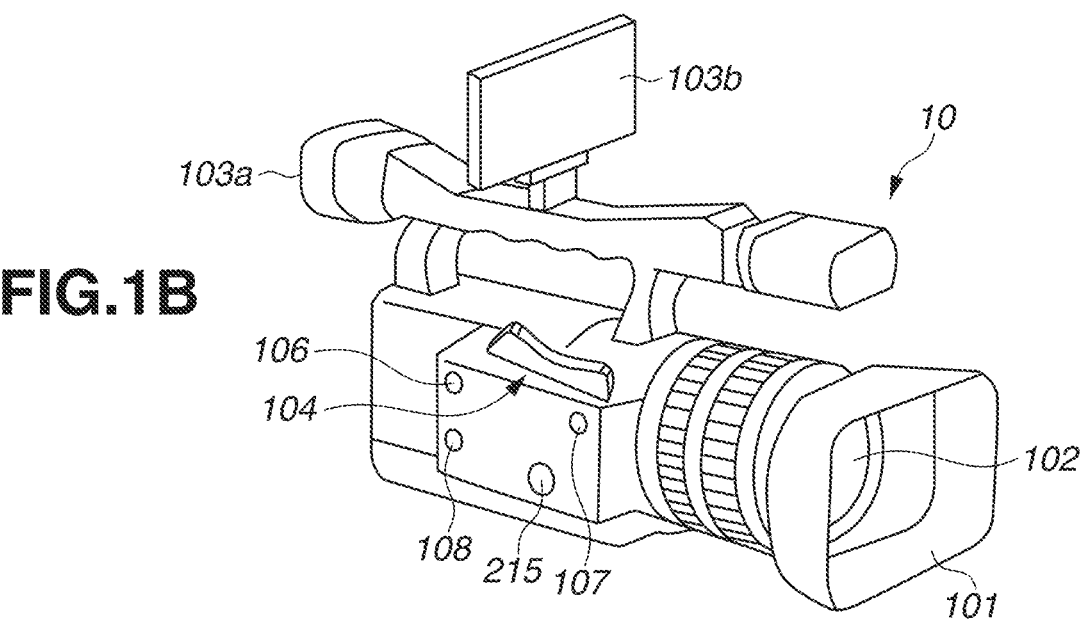
Figure 1C:
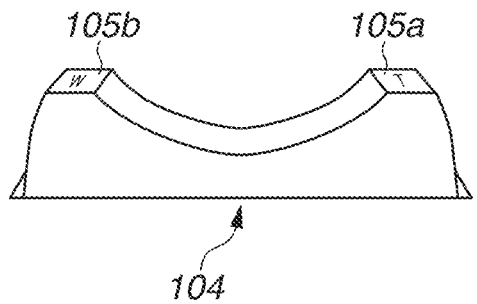

FIGS. 1A to 1C are diagrams illustrating an example of an external configuration of the camera 10. FIG. 1A is a perspective view of the camera 10 from one side. FIG. 1B is a perspective view of the camera 10 from the other side.

The camera 10 includes a barrier 101 and an imaging lens 102 on the front side. The camera 10 includes a viewfinder that serves as a display unit 103a, and a display unit 103b that is arranged outside the viewfinder on top of the main body of the camera 10. The display units 103a and 103b correspond to examples of a display unit. While outputs can be made simultaneously to the display units 103a and 103b, an output can be made independently to each of the display units 103a and 103b. In the following description, the display units 103a and 103b will be referred to as a display unit 103 if no distinction is made. The camera 10 includes a seesaw-type grip zoom 104 (zoom key) serving as an operation device, on a side of the main body portion. The grip zoom 104 corresponds to an example of an operation member. The camera 10 further includes a menu button 106, an imaging button 107, a playback button 108, and a power switch 215. A menu screen is displayed on the display unit 103 in response to pressing of the menu button 106, whereby a custom zoom setting screen to be described below can be displayed. Instructions to capture a still image and a moving image can be issued based on pressing of the imaging button 107.

FIG. 1C is an enlarged view of the grip zoom 104. The grip zoom 104 is operated by a user's depressing operations—e.g. a user can depress first operation portion 105a to zoom in and depress second operation portion 105b to zoom out. The camera 10 is assigned zoom speeds (functions or amounts of action) based on the amounts of depression (amounts of operation) when the grip zoom 104 is depressed from a reference position. Specifically, the grip zoom 104 includes a first operation portion 105a and a second operation portion 105b. The first operation portion 105a is an operation portion for the user to zoom in on a telephoto side (T side). The second operation portion 105b is an operation portion for the user to zoom out to a wide angle side (W side). If the user depresses the first operation portion 105a, the camera 10 zooms in at a zoom speed assigned to the amount of depression—i.e. the zoom speed depends on the amount of depression. If the user depresses the second operation portion 105b, the camera 10 zooms out at a zoom speed assigned to the amount of depression. The grip zoom 104 is configured to return to the reference position (initial position) if the user releases the depression of the first operation portion 105a or the second operation portion 105b.

Figures 1, 15A:
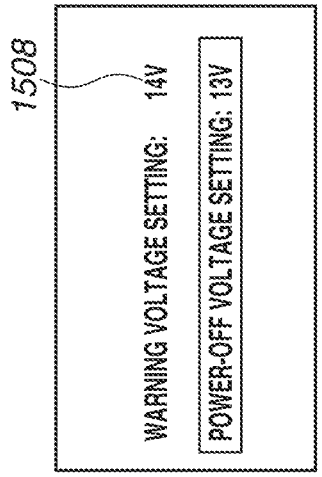
FIGS. 15A-1 to 15A-3 and FIGS. 15B-1 to 15B-3 illustrate examples of setting items and setting values according to a third exemplary embodiment.
Figures 2, 15A:
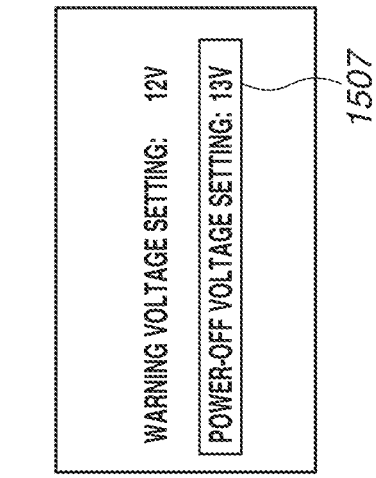
FIG. 2 is a block diagram illustrating a configuration example of the camera.

FIG. 2 is a block diagram illustrating a configuration example of the camera 10.

The imaging lens 102 is a lens unit including a zoom lens and a focus lens. The zoom lens changes a zoom magnification by changing a focal length. The zoom lens is controlled by a zoom control unit 201. The focus lens is a lens that performs focusing. The focus lens is controlled by a distance measurement control unit 202.

An imaging unit 203 is an image sensor including a charge-coupled device (CCD) or complementary metal-oxide-semiconductor (CMOS) sensor that converts an optical image into an electrical signal. The imaging unit 203 corresponds to an example of an imaging unit. An analog-to-digital (A/D) converter 204 converts an analog signal output from the imaging unit 203 into a digital signal. The barrier 101 covers an imaging system including the imaging lens 102 of the camera 10 and thereby prevents stains and damage to the imaging system.

An image processing unit 205 performs resize processing, such as predetermined pixel interpolation and reduction, and color conversion processing on image data from the A/D converter 204 or image data from a memory control unit 206. The image processing unit 205 performs predetermined calculation processing by using captured image data, and a system control unit 50 performs exposure control and distance measurement control based on the obtained calculation result. Through-the-lens (TTL) automatic focus (AF) processing, automatic exposure (AE) processing, and preliminary flash emission (electronic flash (EF)) processing are thereby performed. The image processing unit 205 further performs predetermined calculation processing by using the captured image data, and performs TTL automatic white balance (AWB) processing based on the obtained calculation result.

The image data from the A/D converter 204 is written into a memory 207 via the image processing unit 205 and the memory control unit 206 or directly via the memory control unit 206. The memory 207 stores image data that is obtained by the imaging unit 203 and digitally converted by the A/D converter 204, and image data to be displayed on the display unit 103. The memory 207 has a storage capacity sufficient to store a predetermined number of still images and a predetermined duration of moving images and audios. The memory 207 also serves as an image display memory (video memory) in displaying image data read from a recording medium 208 and on-screen display (OSD) data on the display unit 103.

A digital-to-analog (D/A) converter 209 converts image data intended for image display, which is stored in the memory 207, into an analog signal and supplies the analog signal to the display unit 103. The image data intended for image display, written to the memory 207, is thus displayed by the display unit 103 via the D/A converter 209. The display unit 103 provides display on a display device, such as a liquid crystal display (LCD), based on the analog signal from the D/A converter 209. If the digital signal that is once A/D converted by the A/D converter 204 and accumulated in the memory 207 is analog converted by the D/A converter 209 and successively transferred to and displayed on the display unit 103, the display unit 103 functions as an electronic viewfinder and displays a live view image. The display unit 103 according to the present exemplary embodiment is a liquid crystal display, whereas other types of displays such as an organic electroluminescence (EL) display may be used. The display unit 103 is not limited to an electronic viewfinder or a small-sized (for example, 3.5-inch) liquid crystal monitor, and may be implemented by an external output such as High-Definition Multimedia Interface (HDMI) (registered trademark) and a serial digital interface (SDI). The display unit 103 may include a plurality of such display outputs.

A nonvolatile memory 210 is a memory serving as an electrically erasable and recordable recording medium. For example, an electrically erasable programmable read-only memory (EEPROM) is used as the nonvolatile memory 210. The nonvolatile memory 210 stores operation constants of the system control unit 50 and a program. The program is one for performing various flowcharts of the present exemplary embodiment to be described below.

The system control unit 50 controls the entire camera 10. The system control unit 50 implements processes of the present exemplary embodiment to be described below by executing the program stored in the nonvolatile memory 210. The system control unit 50 also performs display control by controlling the memory 207, the D/A converter 209, and the display unit 103. The system control unit 50 corresponds to an example of a control unit, a display control unit, and an assignment unit.

A system memory 211 includes a random access memory (RAM), for example. The system memory 211 stores the operation constants of the system control unit 50, variables, and the program read from the nonvolatile memory 210. A system timer 212 is a clocking unit that measures time used for various types of control and the time of a built-in clock.

An operation unit 213 is an operation unit for inputting various operation instructions into the system control unit 50. The operation unit 213 includes the menu button 106, a cancel button, a directional pad (up key, down key, left key, and right key), a set button, and various selection buttons such as an automatic focus/manual focus (AF/MF) button. For example, if the menu button 106 is pressed, a menu screen showing various settings is displayed on the display unit 103. The user can intuitively select and/or set various settings by using the menu screen displayed on the display unit 103, the directional pad, and the set button.

A mode change switch 214 switches an operation mode of the system control unit 50 to any one of modes including a moving image recording mode and a playback mode.

The power switch 215 is a push button for switching power on and off.

The grip zoom 104 is a seesaw-type device (i.e. a type of operation member) and is operated by depression. The system control unit 50 detects the amount of depression of the first operation portion 105a or the second operation portion 105b of the grip zoom 104, and controls the zoom control unit 201 to change the position of the imaging lens 102 so that the zoom speed assigned to the amount of depression is obtained. The grip zoom 104 according to the present exemplary embodiment is configured so that the greater the amount of depression, the greater the amount of change in voltage. The system control unit 50 then detects the amount of depression by detecting a voltage output by the grip zoom 104. The system control unit 50 thus corresponds to an example of a detection unit that detects the amount of depression of the grip zoom 104.

A power supply control unit 216 includes a battery detection circuit, a direct-current-to-direct-current (DC-DC) converter, and a switch circuit for switching blocks to be energized. The power supply control unit 216 detects the presence or absence of a battery attached, the type of battery, and the remaining battery level. Based on the detection results and instructions from the system control unit 50, the power supply control unit 216 controls the DC-DC converter and supplies various parts, including the recording medium 208, with needed voltages for needed periods.

A power supply unit 217 includes a primary battery such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter. A recording medium interface (I/F) 218 is an I/F with a recording medium 208 such as a memory card and a hard disk. The recording medium 208 is one for recording captured image data, and includes a semiconductor memory or a magnetic disk.

FIGS. 3A to 3E are diagrams illustrating an example of a custom zoom setting screen 300. If the user selects custom zoom setting from a menu via the operation unit 213, the system control unit 50 displays the custom zoom setting screen 300 on the display unit 103. The custom zoom setting screen 300 is a screen for making/setting settings to assign zoom speeds (functions or amounts of action) to the amounts of depression (amounts of operation) of the grip zoom 104 operated by the user.

The custom zoom setting screen 300 displays a remaining recording time 301a, a recording state 301b, a recording time code 301c, a custom zoom setting menu 302, and image data 303. The remaining recording time 301a, the recording state 301b, the recording time code 301c, and the custom zoom setting menu 302 are OSD data and displayed on the image data 303 in a superimposed manner. An example of the image data 303 is a live view image captured by the imaging unit 203.

In the present exemplary embodiment, the custom zoom setting menu 302 can assign 17 levels of zoom speed "0 to 16" to five levels of the amount of depression of the grip zoom 104. The amount of depression is not limited to five levels and there may be, for example, other levels of depression—e.g. three levels of depression, sixteen levels of depression or any number therebetween. The zoom speed is not limited to 17 levels and there may be, for example, other levels of zoom. The zoom level and or depression level may in some examples be indicated by non-numerical levels such as "slow, normal, and fast".

For example, suppose that the user assigns a zoom speed "3" to an amount of depression "1" of the grip zoom 104—i.e. suppose a user assigns a zoom speed of 3 to depression level 1 of the grip zoom 104. In such a case, the camera 10 zooms at the zoom speed "3" if the user is depressing the grip zoom 104 by the amount of depression "1".

In the present exemplary embodiment, the system control unit 50 obtains a numerical value within the range of "−127" to "+127" by converting the voltage detected when the grip zoom 104 is depressed. For example, if a numerical value in the range of "0 to 25" or "−25 to 0" is obtained, the system control unit 50 determines the amount of depression to be "1". The correspondence between the voltage, the numerical value, and the amount of depression is stored in the nonvolatile memory 210 in advance in association with each other. Negative values represent a state in which the grip zoom 104 is depressed to the W side. Positive values represent a state in which the grip zoom 104 is depressed to the T side. A numerical value of "0" represents a state in which the grip zoom 104 is not operated.

The relationship between the five levels of the amount of depression and the numerical values may be such that the levels of the amount of depression are equally divided and the resolution of the numerical values is uniform, or such that different weights are given to the respective levels. Different weights are given to the respective levels, for example, when the amounts of depression "1" and "5" are associated with wider ranges of numerical values than the other amounts of depression are.

The camera 10 according to the present exemplary embodiment can set the overall zoom speed in terms of "high/middle/low" aside from the custom zoom settings. In other words, the zoom speeds "0 to 16" set by the custom zoom setting screen 300 are changed based on the setting of "high/middle/low". The camera 10 according to the present exemplary embodiment can further be set to variable speed zooming or fixed speed zooming. In variable speed zooming, the camera 10 operates at the zoom speeds assigned to the amounts of depression. In fixed speed zooming, the camera 10 operates at a specific zoom speed regardless of the amount of depression.

FIG. 3A illustrates an example of the custom zoom setting screen 300 that is the first displayed. In the state of FIG. 3A, the grip zoom 104 is not operated. The custom zoom setting menu 302 includes a first display section 305 and a second display section 306 on the same screen.

The first display section 305 identifiably displays the amount of depression when the grip zoom 104 is operated. The first display section 305 displays an indicator 307 and a depression level display 308 by OSD data. The indicator 307 is a display item indicating the amount of depression of the grip zoom 104—that is, for example, the indicator 307 indicates the current depression level of the grip zoom 104. The depression level display 308 is a display item indicating the five possible levels of the amount of depression. It will be appreciated that the position of indicator 307 relative to the depression level display 308 can indicate the amount of depression that is currently being applied. The depression level display 308 displays divided regions, which are divided between the amounts of depression of the first operation portion 105a on the T side and those of the second operation portion 105b on the W side. The system control unit 50 displays the indicator 307 based on the amount of depression detected when the grip zoom 104 is operated. In FIG. 3A, the indicator 307 is located at the center since the grip zoom 104 is not operated.

The second display section 306 identifiably displays the zoom speeds assigned to the amounts of depression. The second display section 306 displays zoom speeds 309a to 309e corresponding to depression positions D "pos1" to "pos5", an item cursor 310, and up/down key items 311 by OSD data. The depression positions D "pos1" to "pos5" allow the zoom speeds for each depression position to be set and, accordingly, they correspond to the five levels of the amount of depression. Specifically, the depression position D "pos1" corresponds to the amount of depression "1". The depression position D "pos2" corresponds to the amount of depression "2". The depression position D "pos3" corresponds to the amount of depression "3". The depression position D "pos4" corresponds to the amount of depression "4". The depression position D "pos5" corresponds to the amount of depression "5". The zoom speeds 309a to 309e indicate the currently set zoom speed for depression level/position "pos1" to "pos5" respectively, and their values range from 0 to 16, each value corresponding to a different zoom speed. Take, for example, the depression position D "pos1" and the zoom speed 309a in FIG. 3A. The depression position D "pos1" is assigned a zoom speed of "1". The user can thus check the second display section 306 for the zoom speeds assigned to the amounts of depression.

In FIG. 3A, the item cursor 310 is located at the depression position D "pos1". The up/down key items 311 are displayed above and below the item cursor 310. The item cursor 310 indicates that the user can assign the zoom speed 309a at the depression position D "pos1" in a selectable manner. Specifically, the user can change the zoom speed corresponding to the depression position D "pos1" from "1" to a different zoom speed by operating the up key or down key (up/down keys) of the directional pad of the operation unit 213. The user can change the item cursor 310 from the depression position D "pos1" to a different depression position D "pos2" to "pos5" by operating the left key or right key (left/right keys) of the directional pad of the operation unit 213. In such a manner, the user can also select and assign the zoom speeds 309b to 309e at the depression positions D "pos2" to "pos5" in a selectable manner.

FIG. 3B illustrates an example of the custom zoom setting screen 300 that is displayed when the first operation portion 105a on the T side of the grip zoom 104 is operated.

In FIG. 3B, the indicator 307 is moved to the T side of the depression level display 308 since the first operation portion 105a of the grip zoom 104 is depressed. Specifically, the indicator 307 falls within the range of the amount of depression "3" on the T side of the depression level display 308. In such a manner, the amount of depression when the user actually depresses the first operation portion 105a of the grip zoom 104 is identifiably displayed by using the indicator 307.

In FIG. 3B, the item cursor 310 is located at the depression position D "pos3". If the user continues depressing the first operation portion 105a of the grip zoom 104 by the amount of depression "3" for a predetermined time, the item cursor 310 is moved and displayed at the depression position D "pos3" corresponding to the amount of depression "3". The user can then change and assign the zoom speed corresponding to the depression position D "pos3" by operating the up/down keys of the directional pad of the operation unit 213. Processing for implementing such actions of the item cursor 310 will be described below.

FIG. 3C illustrates an example of the custom zoom setting screen 300 that is displayed when the second operation portion 105b on the W side of the grip zoom 104 is operated.

In FIG. 3C, the indicator 307 is moved to the W side of the depression level display 308 since the second operation portion 105b of the grip zoom 104 is depressed. Specifically, the second operation portion 105b is depressed to the maximum, and the indicator 307 is located at the end (amount of depression "5") on the W side of the depression level display 308. In such a manner, the amount of depression when the user actually depresses the second operation portion 105b of the grip zoom 104 is identifiably displayed by using the indicator 307.

In FIG. 3C, the item cursor 310 is located at the depression position D "pos5". In this example, the user continued to depress the second operation portion 105b of the grip zoom 104 by the amount of depression "5" for a predetermined time and consequently the item cursor 310 moved to the depression position D "pos5" corresponding to the amount of depression "5". The user can then change and assign the zoom speed corresponding to the depression position D "pos5" by operating the up/down keys of the directional pad of the operation unit 213.

In the present exemplary embodiment, the zoom speeds that are the setting values assigned to the depression positions D "pos1" to "pos5" have a relationship in magnitude. Specifically, the zoom speed increases in order from the depression position D "pos1" to the depression position D "pos5". The "setting value at the depression position D 'pos1'" will be referred to as the "setting value of the setting item pos1". Then, there is a relationship in magnitude such that the setting value of the setting item pos1<the setting value of the setting item pos2<the setting value of the setting item pos3<the setting value of the setting item pos4<the setting value of the setting item pos5. If same setting values are permitted, the relationship in magnitude is such that the setting value of the setting item pos1≤the setting value of the setting item pos2≤the setting value of the setting item pos3≤the setting value of the setting item pos4≤the setting value of the setting item pos5. The camera 10 sets a setting item to a setting value assigned by the user while correcting the other setting values so that all setting values maintain the foregoing relationship in magnitude.

The purpose of maintaining the relationship in magnitude is to prevent, for example, the setting values from decreasing or increasing conversely while the user expects the setting values to increase or decrease based on operations. Specifically, if the user depresses the grip zoom 104 further, the user expects the zoom speed to increase. The relationship in magnitude is maintained to prevent the zoom speed from decreasing conversely. Similarly, if the user depresses the grip zoom 104 less, the user expects the zoom speed to decrease. The relationship in magnitude is maintained to prevent the zoom speed from increasing conversely. Processing for correcting the setting values to maintain such a relationship in magnitude will be described below.

Figure 4:
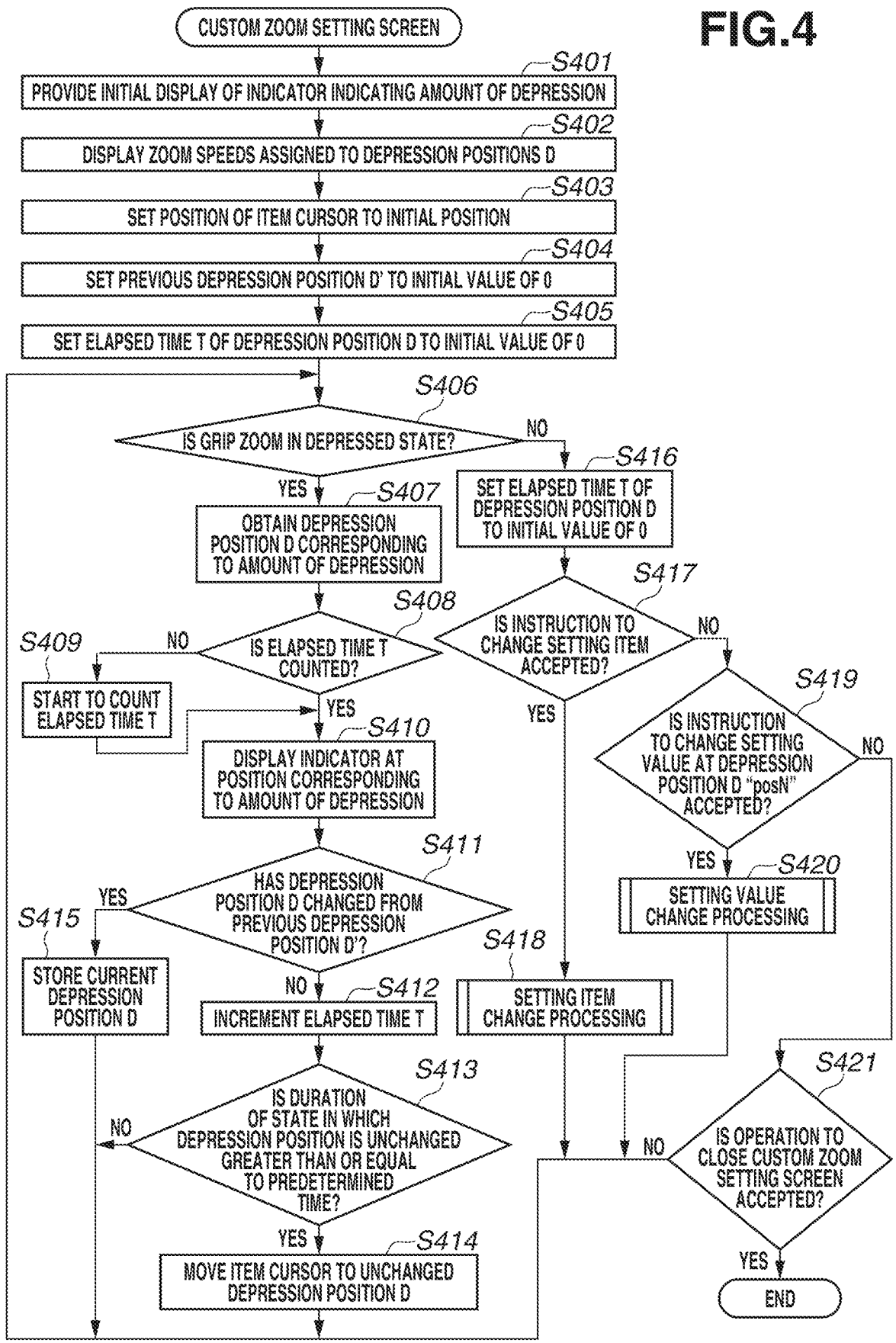
FIG. 4 is a flowchart of display processing of the custom zoom setting screen.

Next, processing from a display to an end of the custom zoom setting screen 300 will be described with reference to the flowchart of FIG. 4. The flowchart of FIG. 4 is implemented by the system control unit 50 reading the program stored in the nonvolatile memory 210, loading the program into the system memory 211, and executing the program. The flowchart of FIG. 4 is started if the operation mode is the moving image recording mode and the user selects custom zoom setting from the menu.

In step S401, the system control unit 50 displays the custom zoom setting screen 300. Specifically, the system control unit 50 displays the custom zoom setting screen 300 including the custom zoom setting menu 302 illustrated in FIG. 3A, and provides an initial display of the indicator 307 indicating the amount of depression of the grip zoom 104.

In step S402, the system control unit 50 displays the zoom speeds assigned to the depression positions D. Specifically, the system control unit 50 reads information that associates the depression positions D with the zoom speeds from the nonvolatile memory 210. Based on the read information, the system control unit 50 displays the zoom speeds 309a to 309e assigned to the depression positions D "pos1" to "pos5" as illustrated in the second display section 306 of FIG. 3A.

In step S403, the system control unit 50 sets the position of the item cursor 310 to an initial position. Specifically, as illustrated in FIG. 3A, the system control unit 50 displays the item cursor 310 at the depression position D "pos1".

In step S404, the system control unit 50 sets a variable termed "previous depression position D'" to an initial value of 0. The previous depression position D' is a variable used in determining whether a depressed state continues. The system control unit 50 stores the variable into the system memory 211.

In step S405, the system control unit 50 sets an elapsed time T of a depression position D to an initial value of 0. The elapsed time T of a depression position D is a variable used in determining whether a depressed state continues. The system control unit 50 stores the variable into the system memory 211.

In step S406, the system control unit 50 determines whether the grip zoom 104 is in a depressed state. If the grip zoom 104 is in a depressed state (YES in step S406), the processing proceeds to step S407. If the grip zoom 104 is not in a depressed state (NO in step S406), the processing proceeds to step S416. The system control unit 50 converts the voltage detected from the grip zoom 104, and if the converted numerical value is not 0, determines that the grip zoom 104 is in a depressed state.

In step S407, the system control unit 50 obtains a depression position D. Specifically, the system control unit 50 obtains the amount of depression from the numerical value converted in step S406, and obtains the depression position D corresponding to the obtained amount of depression among the depression positions D "pos1" to "pos5". For example, if the converted numerical value is "0 to 25" or "−25 to 0", the depression position D is "pos1". If the converted numerical value is "+64", the depression position D is "pos3". If the converted numerical value is "−127", the depression position D is "pos5". The correspondence between the numerical values, the amounts of depression, and the depression positions D "pos1" to "pos5" is stored in the nonvolatile memory 210 in advance in association with each other.

In step S408, the system control unit 50 determines whether the elapsed time T of the depression position D is counted. If the elapsed time T is not counted (NO in step S408), the processing proceeds to step S409. If the elapsed time T is counted (YES in step S408), the processing proceeds to step S410. If the processing proceeds to step S408 for the first time since the flowchart of FIG. 4 is started, the elapsed time T has an initial value of 0. The processing then proceeds to step S409 since the elapsed time T is not counted.

In step S409, the system control unit 50 starts to count the elapsed time T.

In step S410, the system control unit 50 displays the indicator 307 at a position corresponding to the amount of depression in the state where the user is actually depressing the grip zoom 104. Specifically, the system control unit 50 displays the indicator 307 at a position corresponding to the numerical value converted in step S407. For example, if the converted numerical value is "+64", the indicator 307 is displayed at a position corresponding to the amount of depression "3" on the T side as illustrated in FIG. 3B. If the converted numerical value is "−127", the indicator 307 is displayed at the end (amount of depression "5") on the W side as illustrated in FIG. 3C. Advantageously therefore, the user can thus easily identify the amount of depression when depressing the grip zoom 104. In the custom zoom setting menu 302, the amounts of depression "1" to "5" are associated with the depression positions D "pos1" to "pos5". The user can thus easily identify which depression position D the current amount of depression corresponds to.

In step S411, the system control unit 50 determines whether the depression position D has changed from the previous depression position D'. Specifically, if the depression position D obtained by the system control unit 50 in step S407 is different from the previous depression position D' already stored in the system memory 211, the system control unit 50 determines that the depression position D has changed from the previous depression position D'. If the depression position D has changed (YES in step S411), the processing proceeds to step S415. If the depression position D has not changed (NO in step S411), the processing proceeds to step S412.

In step S412, the system control unit 50 increments the elapsed time T and stores the incremented elapsed time T into the system memory 211. Here, the elapsed time T is incremented in units of the cycle of execution of step S412, such as 16 msec and 1 sec.

In step S413, the system control unit 50 determines whether the duration of the state in which the depression position D is unchanged is greater than or equal to a predetermined time. If the duration is greater than or equal to the predetermined time, i.e., the depression position D has lasted for the predetermined time (YES in step S413), the processing proceeds to step S414. If the duration is not greater than or equal to the predetermined time (NO in step S413), the processing returns to step S406. The predetermined time is set in consideration of time for the grip zoom 104 to return to its initial position when the finger is released. Taking into consideration the time it takes for the grip zoom 104 to return to the initial position can prevent the depression position D from being accidentally determined to have lasted for the predetermined time. For example, the predetermined time is 160 msec or 3 sec. The predetermined time is stored in the nonvolatile memory 210 in advance.

In step S414, the system control unit 50 moves and displays the item cursor 310 at the depression position D that is unchanged for the predetermined time or more. For example, if the amount of depression corresponding to the depression position D "pos3" has lasted for the predetermined time or more, the system control unit 50 moves and displays the item cursor 310 at the depression position D "pos3" as illustrated in FIG. 3B. If the item cursor 310 is already displayed at the unchanged depression position D, the processing of step S414 is skipped. In such a manner, if the amount of depression corresponding to the depression position D has lasted for the predetermined time or more, the item cursor 310 is moved to the depression position D. The user can thus easily perform the operation of assigning a zoom speed to the amount of depression since the user does not need to check the state of the depression position D by himself/herself and then make an operation to move the item cursor 310. The processing then returns to step S406.

In step S415, the system control unit 50 stores the current depression position D that is changed. Specifically, the system control unit 50 substitutes the depression position D obtained in step S407 into the variable and stores the variable into the system memory 211. The system control unit 50 stops the count started in step S409. The processing then returns to step S406.

In step S416, the system control unit 50 sets the elapsed time T of the depression position D to an initial value of 0. In step S417, the system control unit 50 determines whether an instruction to change the setting item is accepted. Specifically, if the user operates the left or right key of the directional pad of the operation unit 213 in a state where the item cursor 310 is located at any one of the depression positions D "pos1" to "pos5", the system control unit 50 determines that an instruction to change the setting item is accepted. If the instruction to change the setting item is accepted (YES in step S417), the processing proceeds to step S418. If the instruction to change the setting item is not accepted (NO in step S417), the processing proceeds to step S419.

In step S418, the system control unit 50 performs setting item change processing. For example, suppose that the left key of the directional pad of the operation unit 213 is operated in the state of FIG. 3C. In such a case, the system control unit 50 moves the item cursor 310 from the depression position D "pos5" to the depression position D "pos4" and displays the item cursor 310 at the depression position D "pos4" based on the operation. The processing then returns to step S406. The setting item change processing will be described below with reference to the flowchart of FIG. 5.

In step S419, the system control unit 50 determines whether an instruction to change the setting value at a depression position D "posh" is accepted. Specifically, if the user operates the up or down key of the directional pad of the operation unit 213 in a state where the item cursor 310 is located at any one of the depression positions D "pos1" to "pos5", the system control unit 50 determines that an instruction to change the setting value is accepted. If the instruction to change the setting value is accepted (YES in step S419), the processing proceeds to step S420. If the instruction to change the setting value is not accepted (NO in step S419), the processing proceeds to step S421. The set button of the operation unit 213 may be operated to enter a setting value change instruction screen, and the instruction to change the setting value may be accepted on the setting value change instruction screen.

In step S420, the system control unit 50 performs the setting value change processing. For example, if the down key of the directional pad of the operation unit 213 is pressed in the state of FIG. 3C, the system control unit 50 changes the zoom speed from "16" to "15". If the zoom speed is changed from "16" to "15", the system control unit 50 controls the zoom control unit 201 so that the zoom speed for the amount of depression corresponding to the depression position D "pos5" of the grip zoom 104 becomes somewhat lower. The processing then returns to step S406. The setting value change processing will be described below with reference to the flowchart of FIG. 7.

In step S421, the system control unit 50 determines whether an operation to close the custom zoom setting screen 300 is accepted. If the operation to close the custom zoom setting screen 300 is accepted (YES in step S421), the system control unit 50 ends the processing of the flowchart of FIG. 4 by ending displaying the custom zoom setting screen 300. When closing the custom zoom setting screen 300, the system control unit 50 stores the depression position D that is the setting item and the zoom speed that is the setting value into the nonvolatile memory 210 in association with each other. The system control unit 50 also stores information indicating the position of a setting value cursor to be described below. On the other hand, if the operation to close the custom zoom setting screen 300 is not accepted (NO in step S421), the processing returns to step S406. The system control unit 50 then repeats the foregoing processing.

Figure 5:
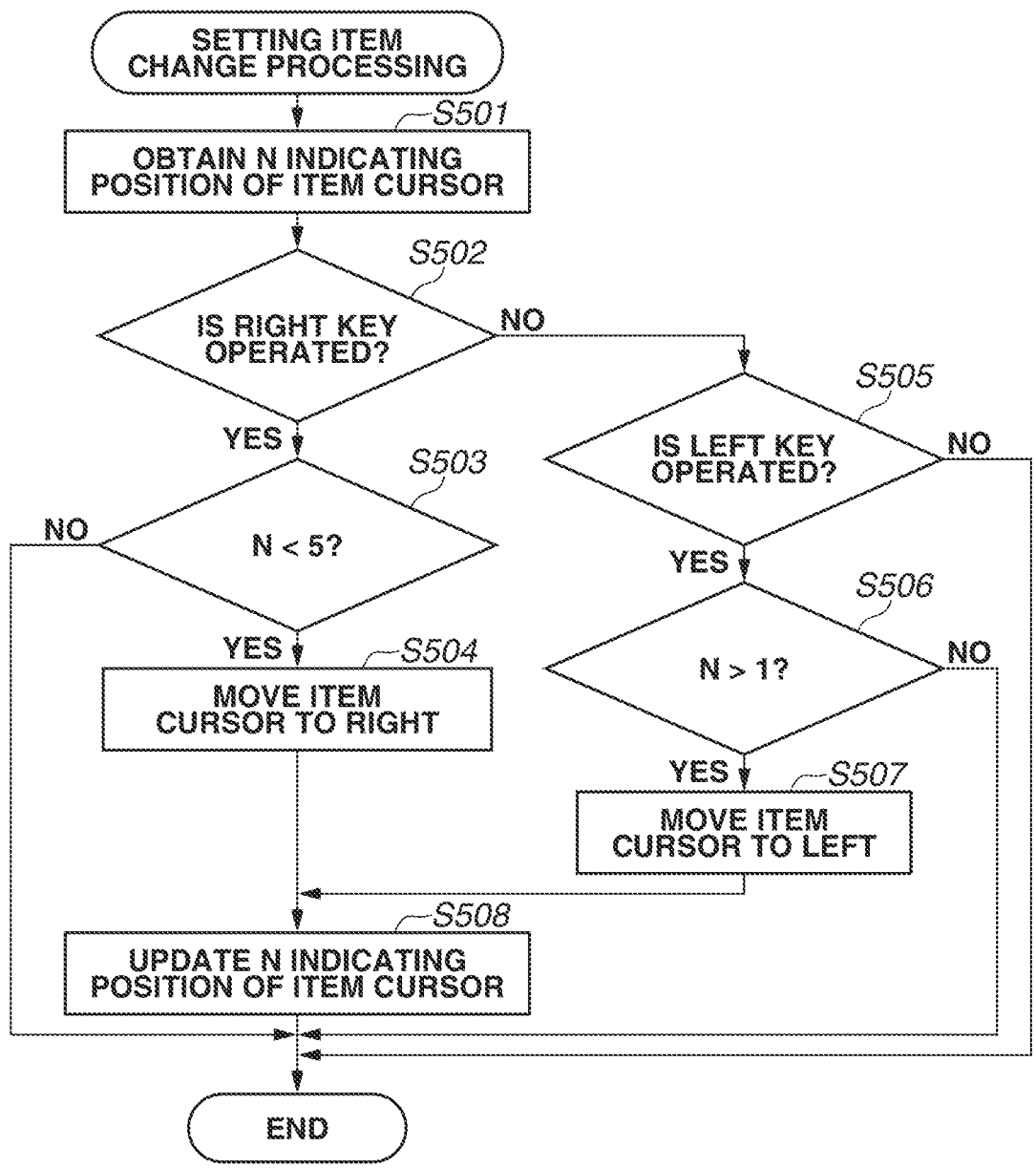
FIG. 5 is a flowchart of setting item change processing.

Next, the setting item change processing will be described with reference to the flowchart of FIG. 5. The flowchart of FIG. 5 corresponds to the setting item change processing in step S418 of the flowchart of FIG. 4. In step S501, the system control unit 50 obtains N (N=1 to 5) that indicates the position of the item cursor 310. Specifically, the system control unit 50 obtains the numerical value that follows "pos" of the depression position D stored in the system memory 211, and assumes the numerical value as N indicating the position of the item cursor 310.

In step S502, the system control unit 50 determines whether the right key of the directional pad of the operation unit 213 is operated. The operation on the right key of the directional pad of the operation unit 213 is an operation to move the item cursor 310 to the right. If the right key is operated (YES in step S502), the processing proceeds to step S503. If the right key is not operated (NO in step S502), the processing proceeds to step S505.

In step S503, the system control unit 50 determines whether the obtained N indicating the position of the item cursor 310 is less than the number of setting items, i.e., 5. If N is 5, the item cursor 310 is unable to be moved to the right. The system control unit 50 therefore checks whether there is room to move the item cursor 310 to the right. If N is less than 5 (YES in step S503), the processing proceeds to step S504. If N is not less than 5 (NO in step S503), the processing of the flowchart of FIG. 5 ends since the item cursor 310 is unable to be moved. The processing then returns to step S406 of FIG. 4.

In step S504, the system control unit 50 moves the item cursor 310 to the right by one and displays the item cursor 310. Specifically, the system control unit 50 changes N indicating the position of the item cursor 310 to N+1, and moves and displays the item cursor 310 at the depression position D "posN+1".

Figure 6A:
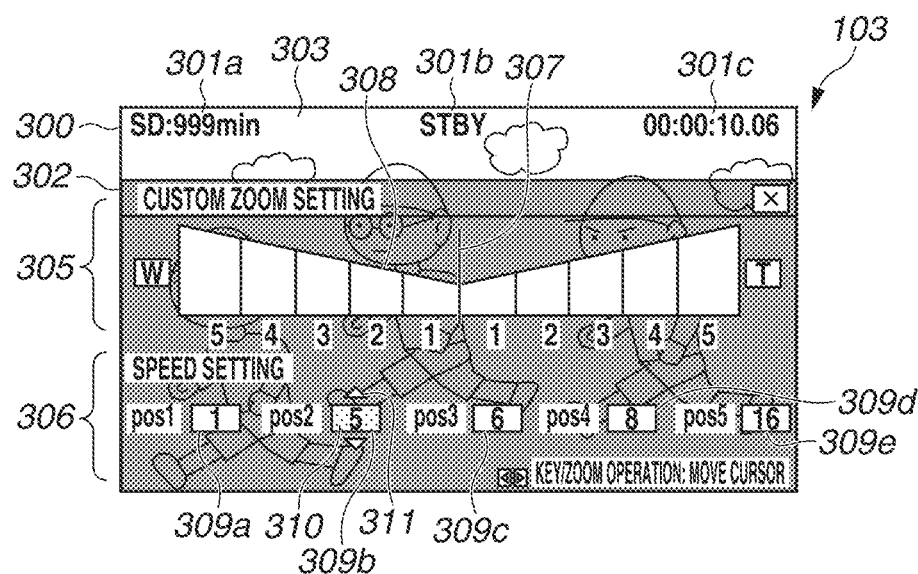
FIGS. 6A to 6C illustrate the custom zoom setting screen.
Figure 6B:
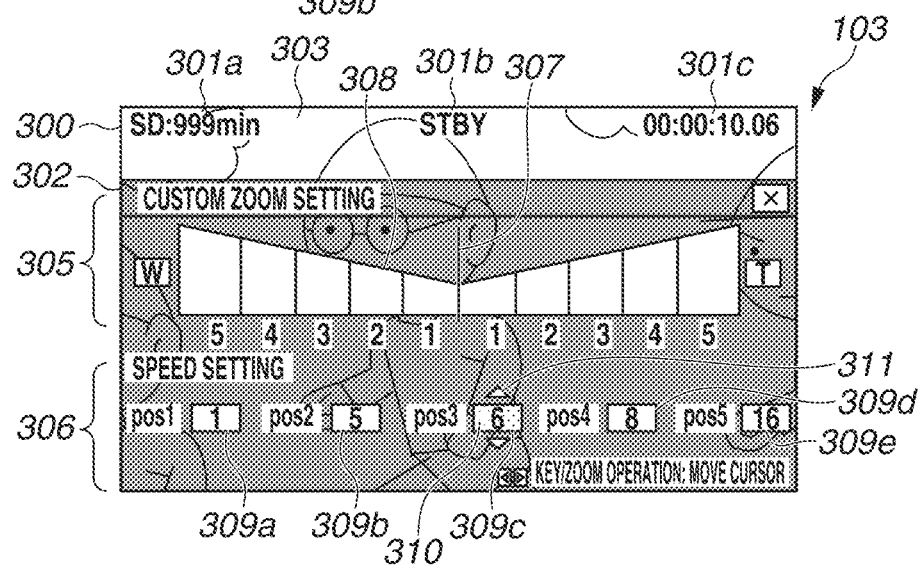
Figure 6C:
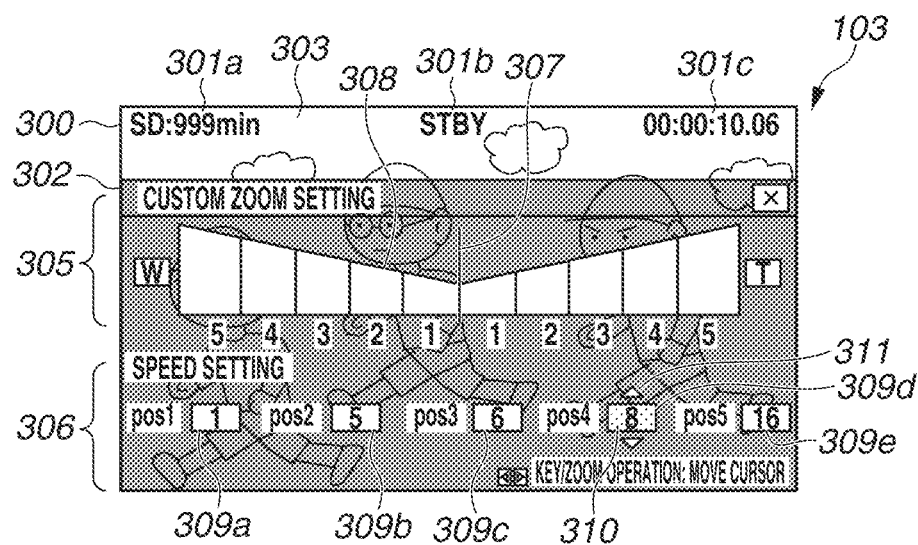

FIGS. 6A to 6C are diagrams illustrating an example of the custom zoom setting screen 300.

FIG. 6A illustrates a state in which the item cursor 310 is displayed at the depression position D "pos2". If the user makes an operation to move the item cursor 310 to the right in the state of FIG. 6A, the item cursor 310 is moved and displayed at the depression position D "pos3" as illustrated in FIG. 6B. If the user makes an operation to move the item cursor 310 further to the right in the state of FIG. 6B, the item cursor 310 is moved and displayed at the depression position D "pos4" as illustrated in FIG. 6C.

In step S505, the system control unit 50 determines whether the left key of the directional pad of the operation unit 213 is operated. The operation on the left key of the directional pad of the operation unit 213 is an operation to move the item cursor 310 to the left. If the left key is operated (YES in step S505), the processing proceeds to step S506. If the left key is not operated (NO in step S505), the processing of the flowchart of FIG. 5 ends. The processing then returns to step S406 of FIG. 4.

In step S506, the system control unit 50 determines whether the obtained N indicating the position of the item cursor 310 is greater than 1. If N is 1, the item cursor 310 is unable to be moved to the left. The system control unit 50 therefore checks whether there is room to move the item cursor 310 to the left. If N is greater than 1 (YES in step S506), the processing proceeds to step S507. If N is not greater than 1 (NO in step S506), the processing of the flowchart of FIG. 5 ends since the item cursor 310 is unable to be moved. The processing then returns to step S406 of FIG. 4.

In step S507, the system control unit 50 moves the item cursor 310 to the left by one and displays the item cursor 310. Specifically, the system control unit 50 changes N indicating the position of the item cursor 310 to N−1, and moves and displays the item cursor 310 at the depression position D "posN−1".

If the user makes an operation to move the item cursor 310 to the left in the state of FIG. 6C, the item cursor 310 is moved and displayed at the depression position D "pos3" as illustrated in FIG. 6B. If the user makes an operation to move the item cursor 310 further to the left in the state of FIG. 6B, the item cursor 310 is moved and displayed at the depression position D "pos2" as illustrated in FIG. 6A.

In step S508, the system control unit 50 updates N indicating the position of the item cursor 310 and stores the updated N into the system memory 211. Then, the processing of the flowchart of FIG. 5 ends. The processing returns to step S406 of FIG. 4.

Next, the setting value change processing will be described with reference to the flowchart of FIG. 7.

In the following description, a setting item posN refers to the setting item at a depression position D "posN" where the item cursor 310 is located. The range of the setting value of the setting item posN is "0 to 16". The position of the setting value cursor (order of the setting value) is denoted by M. The range of M is "1 to 17".

A relationship between the position M of the setting value cursor and the setting value will be described with reference to FIGS. 3D and 3E. FIG. 3D illustrates a state in which the item cursor 310 is located and displayed at the setting item pos3, and a zoom speed 309c of "6" is assigned as the setting value of the setting item pos3.

FIG. 3E illustrates the relationship between M indicating the position of the setting value cursor (setting value cursor M) and the setting value. In the present exemplary embodiment, setting values are 17 integers ranging from 0 to 16. The setting value corresponding to the setting value cursor M=1 is 0. The setting value corresponding the setting value cursor M=7 is 6. Since the setting value of the setting item pos3 illustrated in FIG. 3D is 6, a setting value cursor 312 is at M=7.

Figure 7:
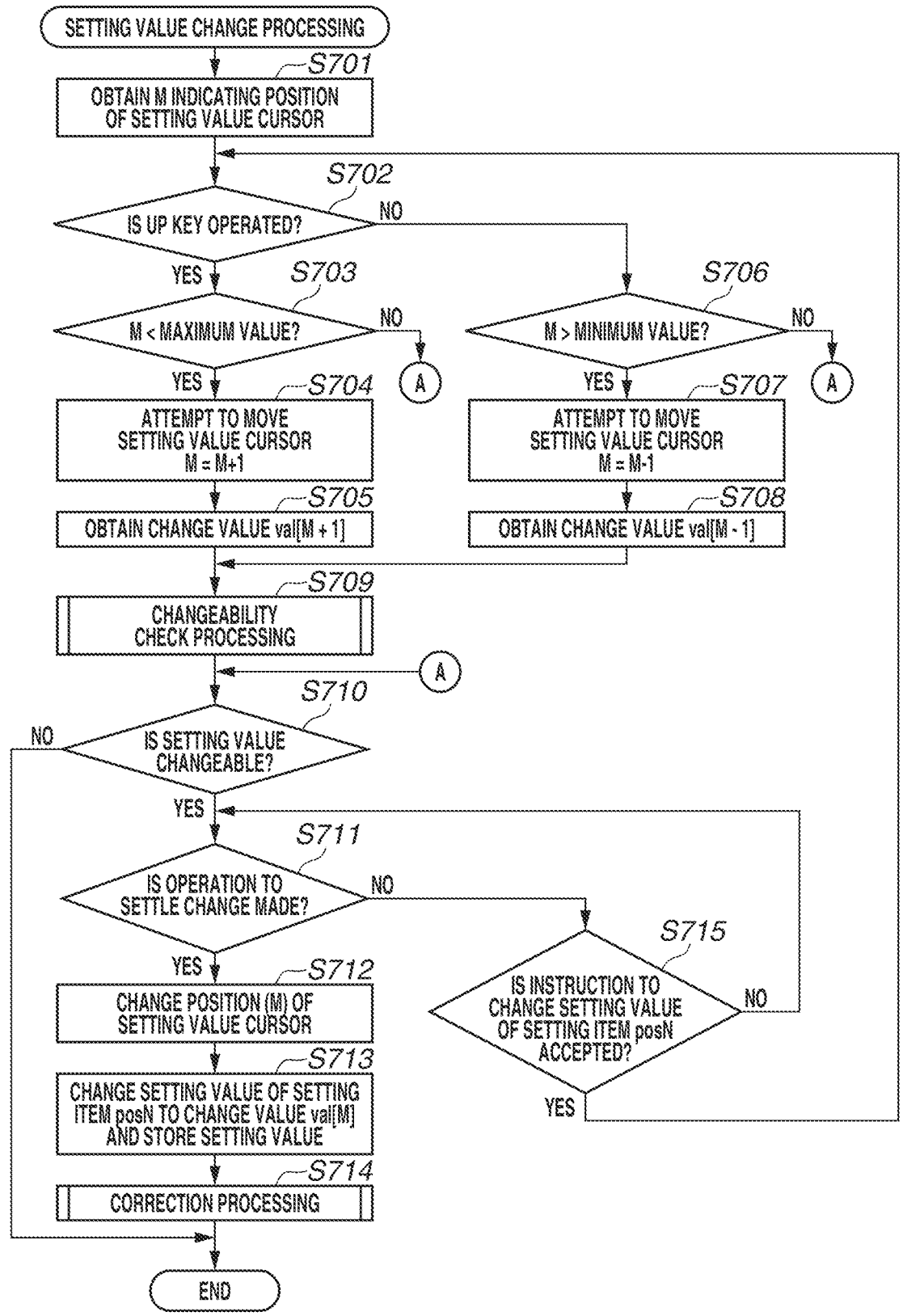
FIG. 7 is a flowchart of setting value change processing.
Figure 8A:
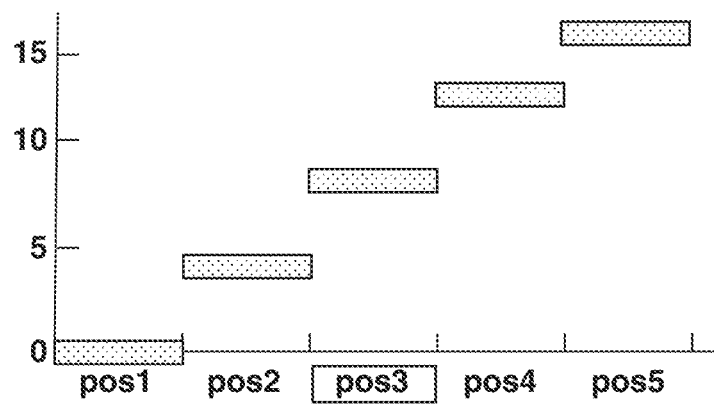
FIGS. 8A to 8C are diagrams for describing an example of the setting value change processing.
Figure 8B:
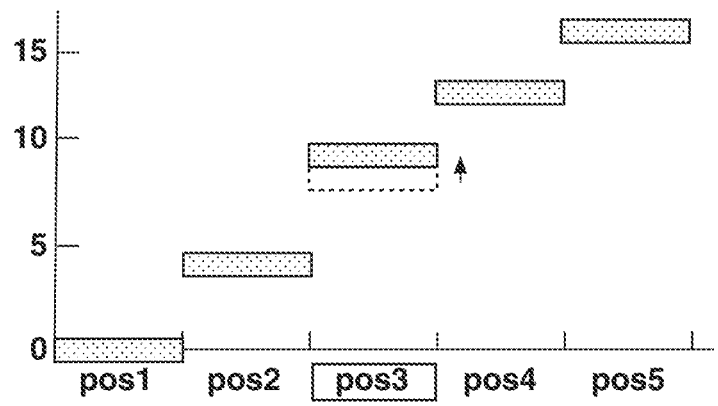
Figure 8C:
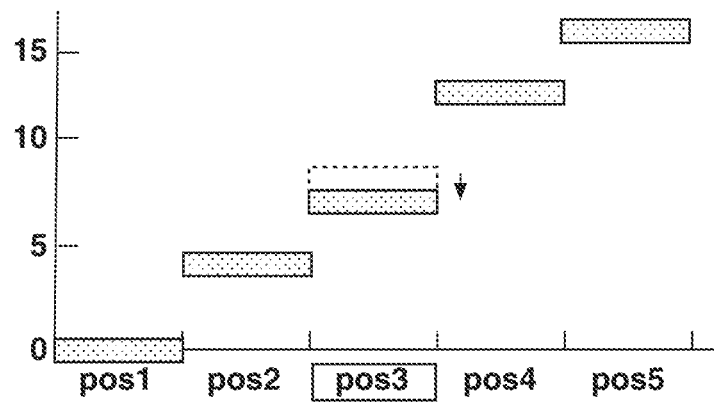

The flowchart of FIG. 7 corresponds to the setting value change processing in step S420 of FIG. 4. FIGS. 8A to 8C are diagrams for describing the processing of the flowchart of FIG. 7. In FIG. 8A, the horizontal axis indicates the setting items pos1 to pos5. The vertical axis indicates the setting values. FIG. 8A illustrates a state in which the item cursor 310 is located at the setting item pos3. In FIG. 8A, the setting item pos1 is assigned a setting value of "0", the setting item pos2 a setting value of "4", the setting item pos3 a setting value of "8", the setting item pos4 a setting value of "12", and the setting item pos5 a setting value of "16".

In step S701, the system control unit 50 obtains M (for example, M=1 to 17) indicating the position of the setting value cursor 312 at the setting item posN. Specifically, the system control unit 50 reads M that indicates the position of the setting value cursor 312 and is stored in the nonvolatile memory 210.

In step S702, the system control unit 50 determines whether the up key of the directional pad of the operation unit 213 is operated. The operation on the up key of the directional pad of the operation unit 213 is an operation to increase the setting value of the setting item posN. If the up key is operated (YES in step S702), the processing proceeds to step S703. If the up key is not operated (NO in step S702), the processing proceeds to step S706, assuming that the down key is operated.

In step S703, the system control unit 50 determines whether M obtained in step S701 is smaller than the maximum value of M indicating the position of the setting value cursor 312. The maximum value of M indicating the position of the setting value cursor 312 is 17. If the obtained M is greater than or equal to the maximum value, the setting value cursor 312 is unable to be moved up. The system control unit 50 therefore checks whether there is room to move the setting value cursor 312 up. If M is smaller than the maximum value (YES in step S703), the processing proceeds to step S704. If M is greater than or equal to the maximum value (NO in step S703), the processing proceeds to step S710.

In step S704, the system control unit 50 sets the setting value cursor M to M+1 by adding 1 to M obtained in step S701. That is, the setting value cursor M=M+1. This processing is intended not to actually move the setting value cursor 312 up by one, but to attempt to move the setting value cursor 312 up by one. In the present exemplary embodiment, the setting value is also increased or decreased by one. A change in the value of the setting value cursor thus coincides with a change in the setting value. However, changes in the setting value and the setting value cursor do not necessarily coincide.

In step S705, the system control unit 50 obtains a change value (setting value) for the case where M is changed to M+1. The change value has the same value as the setting value, but refers to a value that results when the setting value cursor 312 is not actually moved but attempted to be moved, i.e., a value yet to be settled as a setting value. The change value thus has a range of "0 to 16" like the setting value. Specifically, the system control unit 50 obtains a change value val[M+1].

For example, suppose that the up key is operated in a state where the item cursor 310 is located at the setting item pos3 as illustrated FIG. 8B. In such a case, in step S704, the system control unit 50 attempts to move the position of the setting value cursor 312 up by one. In step S705, since the setting value of the setting item pos3 is "8", the system control unit 50 obtains "9" as the change value of the setting value cursor 312 attempted to be moved.

In step S706, the system control unit 50 performs processing for situations where the down key is operated. The system control unit 50 here determines whether M obtained in step S701 is greater than the minimum value of M indicating the position of the setting value cursor 312. The minimum value of M indicating the position of the setting value cursor 312 is 1. If the obtained M is smaller than or equal to the minimum value, the setting value cursor 312 is unable to be moved down. The system control unit 50 therefore checks whether there is room to move the setting value cursor 312 down. If M is greater than the minimum value (YES in step S706), the processing proceeds to step S707. If M is smaller than or equal to the minimum value (NO in step S706), the processing proceeds to step S710.

In step S707, the system control unit 50 sets the setting value cursor M to M−1 by subtracting 1 from M obtained in step S701. That is, the setting value cursor M=M−1. This processing is intended not to actually move the setting value cursor 312 down by one, but to attempt to move the setting value cursor 312 down by one.

In step S708, the system control unit 50 obtains a change value (setting value) for the case where M is changed to M−1. Specifically, the system control unit 50 obtains a change value val[M−1]. For example, suppose that the down key is operated in a state where the item cursor 310 is located at the setting item pos3 as illustrated in FIG. 8C. In such a case, in step S707, the system control unit 50 attempts to move the position of the setting value cursor 312 down by one. In step S708, since the setting value of the setting item pos3 is "8", the system control unit 50 obtains "7" as the change value of the setting value cursor 312 attempted to be moved.

In step S709, the system control unit 50 performs changeability check processing. By the changeability check processing, the system control unit 50 determines whether the setting value of the setting item posN can be changed to the change value obtained in step S705 or S708. The changeability check processing will be described with reference to the flowchart of FIG. 9.

In step S710, the system control unit 50 determines whether the setting value is changeable, based on the result of the changeability check processing. Whether the setting value is changeable is determined based on changeability-indicating information or non-changeability-indicating information that is stored in the system memory 211 in association with the setting item posN. If the setting value is changeable (YES in step S710), the processing proceeds to step S711. If the setting value is not changeable (NO in step S710), the processing of the flowchart of FIG. 7 ends.

In step S711, the system control unit 50 determines whether an operation to settle the change in the setting value of the setting item posN is made. If the settling operation is made (YES in step S711), the processing proceeds to step S712. If the settling operation is not made (NO in step S711), the processing proceeds to step S715.

In step S712, the system control unit 50 changes the position (M) of the setting value cursor 312. Specifically, the system control unit 50 moves the position of the setting value cursor 312 illustrated in FIG. 3E up or down. Here, M indicating the position of the setting value cursor 312 is changed to M=M (setting value cursor in step S701)+1 or M=M (setting value cursor in step S701)−1 as changed in step S704 or S707.

In step S713, the system control unit 50 changes the setting value of the setting item posN to the change value val[M], and stores the setting value into the system memory 211. The system control unit 50 here stores information indicating that the setting value of the setting item posN is a user-set value.

In step S714, the system control unit 50 performs correction processing in response to the change of the setting value of the setting item posN. More specifically, the system control unit 50 corrects the setting values in response to the change of the setting value of the setting item posN so that the other setting values maintain the relationship in magnitude as a whole. The correction processing will be described with reference to the flowchart of FIG. 10.

In step S715, the system control unit 50 determines whether an instruction to change the setting value of the stetting item posN is accepted. Specifically, if the user operates the up or down key of the directional pad of the operation unit 213, the system control unit 50 determines that an instruction to change the setting value is accepted. If the instruction to change the setting value is accepted (YES in step S715), the processing returns to step S702. If the instruction to change the setting value is not accepted (NO in step S715), the processing returns to step S711.

Next, the changeability check processing will be described with reference to the flowchart of FIG. 9.

Figure 9B:
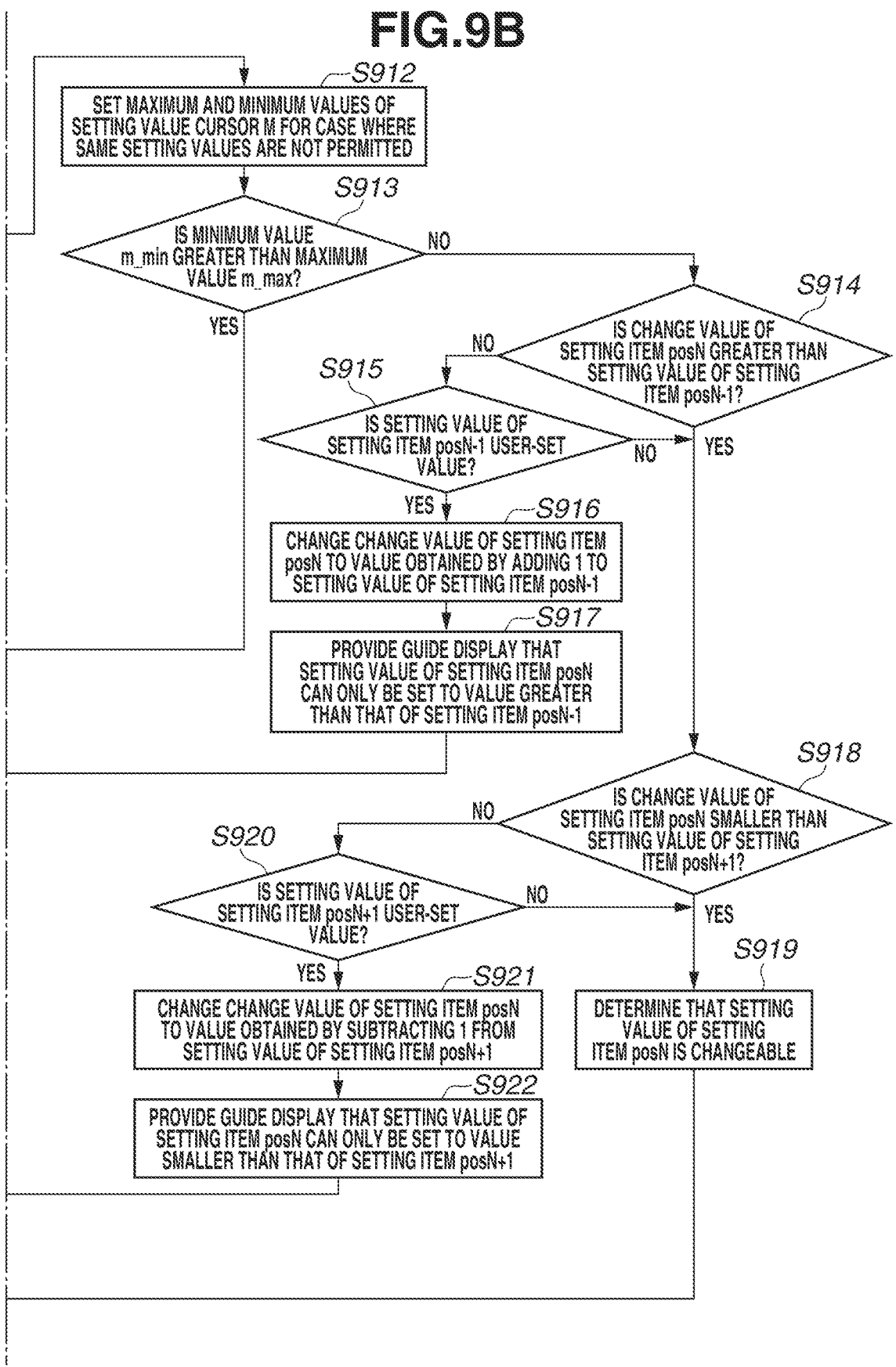

The flowchart of FIG. 9 corresponds to the changeability check processing in step S708 of FIG. 7.

In step S901, the system control unit 50 determines whether same setting values are permitted. Specifically, the case in which same setting values are permitted refers to where the setting values of the respective setting items may have a relationship in magnitude such that the setting value of the setting item pos1≤the setting value of the setting item pos2≤the setting value of the setting item pos3≤the setting value of the setting item pos4≤the setting value of the setting item pos5. The case in which same setting values are not permitted refers to where the setting values of the respective setting items have a relationship in magnitude such that the setting value of the setting item pos1<the setting value of the setting item pos2<the setting value of the setting item pos3<the setting value of the setting item pos4<the setting value of the setting item pos5. Information about whether to permit same setting values is stored, for example, in the nonvolatile memory 210. For example, the information about whether to permit same setting values may be previously stored based on the specifications of the electronic apparatus or the type of setting items, or may be set by the system control unit 50 based on the user's selection. If same setting values are permitted (YES in step S901), the processing proceeds to step S902. If same setting values are not permitted (NO in step S901), the processing proceeds to step S912.

In step S902, the system control unit 50 sets the maximum value and the minimum value of the setting value cursor M on the setting item posN for the case where same setting values are permitted. Specifically, the setting value of the setting item posN can be "0" or "16" regardless of which of the setting items pos1 to pos5 the setting item posN is. A minimum value m_min and a maximum value m_max of the setting value cursor M are thus set to m_min=1 and m_max=17.

In step S903, the system control unit 50 determines whether the change value of the setting item posN is greater than or equal to the setting value of the setting item posN−1. The change value of the setting item posN here is the value obtained in step S705 or S708. If the change value is not greater than or equal to the setting value of the setting item posN−1 (NO in step S903), the processing proceeds to step S904. The case where the processing proceeds to step S904 means that the relationship in magnitude is not maintained between the change value of the setting item posN and the setting value of the setting item posN−1, and the relationship in magnitude changes. In contrast, if the change value is greater than or equal to the setting value of the setting item posN−1 (YES in step S903), the processing proceeds to step S907. The case where the processing proceeds to step S907 means the relationship in magnitude is maintained between the change value of the setting item posN and the setting value of the setting item posN−1. To compare the setting values of the respective setting items pos, the system control unit 50 may compare the values of the setting value cursors M instead of directly comparing the setting values.

In step S904, the system control unit 50 determines whether the setting value of the setting item posN−1 is a user-set value. Whether the setting value a user-set value is determined based on whether information indicating that the value is a user-set one is stored in step S713 of FIG. 7 described above. If the setting value is a user-set value (YES in step S904), the processing proceeds to step S905. If the setting value is not a user-set value (NO in step S904), the processing proceeds to step S907.

In step S905, the system control unit 50 changes the change value of the setting item posN to the setting value of the setting item posN−1. In other words, the system control unit 50 changes the change value of the setting item posN to maintain the relationship in magnitude between the setting values and give priority to the setting value that is previously set by the user.

In step S906, the system control unit 50 informs the user that the setting value of the setting item posN is not changeable. Specifically, the system control unit 50 provides a guide display indicating that the setting value of the setting item posN can only be set to a value greater than or equal to the setting value of the setting item posN−1. The system control unit 50 displays the guide display on the custom zoom setting menu 302 in a superimposed manner. The processing then proceeds to step S923.

In step S907, the system control unit 50 determines whether the change value of the setting item posN is smaller than or equal to the setting value of the setting item posN+1. If the change value is not smaller than or equal to the setting value of the setting item posN+1 (NO in step S907), the processing proceeds to step S909. The case where the processing proceeds to step S909 means that the relationship in magnitude is not maintained between the change value of the setting item posN and the setting value of the setting item posN+1, and the relationship in magnitude changes. If the change value is smaller than or equal to the setting value of the setting item posN+1 (YES in step S907), the processing proceeds to step S908. The case where the processing proceeds to step S908 means that the relationship in magnitude is maintained between the change value of the setting item posN and the setting value of the setting item posN+1.

In step S908, the system control unit 50 determines as a changeability check that the setting value of the setting item posN is changeable. The system control unit 50 stores information indicating that the setting value is changeable into the system memory 211 in association with the setting item posN. This is because the processing proceeds to step S908 if the relationship in magnitude is maintained between the change value of the setting item posN and the setting values of the preceding and subsequent setting items.

In step S909, the system control unit 50 determines whether the setting value of the setting item posN+1 is a user-set value. If the setting value is a user-set value (YES in step S909), the processing proceeds to step S910. If the setting value is not a user-set value (NO in step S909), the processing proceeds to step S908.

In step S910, the system control unit 50 changes the change value of the setting item posN to the setting value of the setting item posN+1. In other words, the system control unit 50 changes the change value of the setting item posN to maintain the relationship in magnitude between the setting values and give priority to the setting value that is previously set by the user.

In step S911, the system control unit 50 informs the user that the setting value of the setting item posN is not changeable. Specifically, the system control unit 50 provides a guide display indicating that the setting value of the setting item posN can only be set to a value greater than or equal to the setting value of the setting item posN+1. The system control unit 50 displays the guide display on the custom zoom setting menu 302 in a superimposed manner. The processing then proceeds to step S923.

In step S912, the system control unit 50 sets the maximum value and the minimum value of the setting value cursor M on the setting item posN for the case where same setting values are not permitted. If same setting value are not permitted, the minimum value m_mim and the maximum value m_max of the setting value cursor M vary depending on the setting item posN. Specifically, the minimum value m_min of the setting value cursor M is set to N that indicates the position of the item cursor 310. The reason why the minimum value m_min is set to N is to maintain the relationship in magnitude that the setting value of the setting item pos1<the setting value of the setting item pos2<the setting value of the setting item pos3<the setting value of the setting item pos4<the setting value of the setting item pos5. To maintain the relationship in magnitude between the setting values, the minimum value m_min of the setting value cursor M on the setting item pos1 is set to 1. The minimum value m_min of the setting value cursor M on the setting item pos2 is set to 2. The minimum value m_min is thus set to the same value as N that indicates the position of the item cursor 310.

Meanwhile, the system control unit 50 sets the maximum value m_max to a value obtained by subtracting N indicating the position of the item cursor 310 from the number of setting items and then subtracting the resulting difference from the maximum possible value of the setting value cursor M. Specifically, the maximum possible value of the setting value cursor M is 17, and the number of setting item is 5. The maximum value m_max is then set to m_max=(17−(5−N)). To maintain the relationship in magnitude between the setting values, the maximum value of the setting value cursor M on the setting item pos5 is set to 17. The maximum value m_max of the setting value cursor M on the setting item pos4 is set to 16. The maximum value m_max is thus set to a value that varies depending on N indicating the position of the item cursor 310.

In step S913, the system control unit 50 compares the set maximum and minimum values m_max and m_min and determines whether the minimum value m_min is greater than the maximum value m_max. If the minimum value m_min is not greater than the maximum value m_max (NO in step S913), the processing proceeds to step S914. If the minimum value m_min is greater than the maximum value m_max (YES in step S913), the processing proceeds to step S923. In the present exemplary embodiment, the setting value cursor M ranges from 1 to 17, and the processing will not proceed from step S913 to step S923. The processing can proceed to step S923 if the number of setting items is small and the setting value is not changeable.

In step S914, the system control unit 50 determines whether the change value of the setting item posN is greater than the setting value of the setting item posN−1. If the change value is not greater than the setting value of the setting item posN−1 (NO in step S914), the processing proceeds to step S915. The case where the processing proceeds to step S915 means that the relationship in magnitude is not maintained between the change value of the setting item posN and the setting value of the setting item posN−1, and the relationship in magnitude changes. In contrast, if the change value is greater than the setting value of the setting item posN−1 (YES in step S914), the processing proceeds to step S918. The case where the processing proceeds to step S918 means that the relationship in magnitude is maintained between the change value of the setting item posN and the setting value of the setting item posN−1.

In step S915, the system control unit 50 determines whether the setting value of the setting item posN−1 is a user-set value. Whether the setting value is a user-set value is determined based on whether information indicating that the value is a user-set one is stored in step S713 of FIG. 7 described above. If the setting value is a user-set value (YES in step S915), the processing proceeds to step S916. If the setting value is not a user-set value (NO in step S915), the processing proceeds to step S918.

In step S916, the system control unit 50 changes the change value of the setting item posN to a value obtained by adding 1 to the setting value of the setting item posN−1. In other words, the system control unit 50 changes the change value of the setting item posN to maintain the relationship in magnitude between the setting values and give priority to the setting value that is previously set by the user.

In step S917, the system control unit 50 informs the user that the setting value of the setting item posN is not changeable. Specifically, the system control unit 50 provides a guide display indicating that the setting value of the setting item posN can only be set to a value greater than the setting value of the setting item posN−1. The system control unit 50 displays the guide display on the custom zoom setting menu 302 in a superimposed manner. The processing then proceeds to step S923.

In step S918, the system control unit 50 determines whether the change value of the setting item posN is smaller than the setting value of the setting item posN+1. If the change value is not smaller than the setting value of the setting item posN+1 (NO in step S918), the processing proceeds to step S920. The case where the processing proceeds to step S920 means that the relationship in magnitude is not maintained between the change value of the setting item posN and the setting value of the setting item posN+1, and the relationship in magnitude changes. On the other hand, if the change value is smaller than the setting value of the setting item posN+1 (YES in step S918), the processing proceeds to step S919. The case where the processing proceeds to step S919 means that the relationship in magnitude is maintained between the change value of the setting item posN and the setting value of the setting item posN+1.

In step S919, the system control unit 50 determines as a changeability check that the setting value of the setting item posN is changeable. The system control unit 50 stores information indicating that the setting value is changeable into the system memory 211 in association with the setting item posN. This is because the processing proceeds to step S919 if the relationship in magnitude is maintained between the change value of the setting item posN and the setting values of the preceding and subsequent setting items.

In step S920, the system control unit 50 determines whether the setting value of the setting item posN+1 is a user-set value. If the setting value is a user-set value (YES in step S920), the processing proceeds to step S921. If the setting value is not a user-set value (NO in step S920), the processing proceeds to step S919.

In step S921, the system control unit 50 changes the change value of the setting item posN to a value obtained by subtracting 1 from the setting value of the setting item posN+1. In other words, the system control unit 50 changes the change value of the setting item posN to maintain the relationship in magnitude between the setting values and give priority to the setting value that is previously set by the user.

In step S922, the system control unit 50 informs the user that the setting value of the setting item posN is not changeable. Specifically, the system control unit 50 provides a guide display indicating that the setting value of the setting item posN can only be set to a value smaller than the setting value of the setting item posN+1. The system control unit 50 displays the guide display on the custom zoom setting menu 302 in a superimposed manner. The processing then proceeds to step S923.

In step S923, the system control unit 50 determines as a changeability check that the setting value of the setting item posN is not changeable. The system control unit 50 stores information indicating that the setting value is not changeable into the system memory 211 in association with the setting item posN. Then, the processing of the flowchart of FIG. 9 ends. The processing proceeds to step S710 of FIG. 7.

Next, the correction processing will be described with reference to the flowchart of FIG. 10. The flowchart of FIG. 10 corresponds to the correction processing in step S714 of FIG. 7.

The processing of steps S1001 to S1013 will initially be described. The processing of steps S1001 to S1013 is processing for correcting the setting values of setting items numbered with numbers smaller than N indicating the position of the item cursor 310, or more specifically, the setting values of the setting items pos1 to posN−1 in response to the change of the setting value of the setting item posN.

In step S1001, the system control unit 50 initially sets an index Target of a setting item posTarget to 1.

In step S1002, the system control unit 50 determines whether the setting values are permitted to be corrected to the same values. This processing is similar to that of step S901. If the setting values are permitted to be corrected to the same values (YES in step S1002), the processing proceeds to step S1003. If not (NO in step S1002), the processing proceeds to step S1006.

In step S1003, the system control unit 50 compares the setting value of the setting item posN with that of the setting item posTarget. If the processing proceeds to step S1003 for the first time since the flowchart of FIG. 10 is started, Target is 1. The system control unit 50 compares the setting value of the setting item posN with that of the setting item pos1. The system control unit 50 determines whether the setting value of the setting item posN is smaller than that of the setting item posTarget. If the setting value of the setting item posN is smaller than that of the setting item posTarget (YES in step S1003), the processing proceeds to step S1004. If not (NO in step S1003), the processing proceeds to step S1012. The case where the processing proceeds to step S1004 means that the relationship in magnitude is not maintained between the setting value of the setting item posN and that of the setting item posTarget, and the relationship in magnitude changes. By contrast, the case where the processing proceeds to step S1012 means that the relationship in magnitude is maintained between the setting value of the setting item posN and that of the setting item posTarget, and the setting value of the setting item posTarget does not need to be corrected.

In step S1004, since the setting values are permitted to be corrected to the same values, the system control unit 50 corrects (changes) and sets the setting value of the setting item posTarget, which is a setting value greater than that of the setting item posN, to the same value as the setting value of the setting item posN. However, this is not restrictive. The system control unit 50 may correct and set the setting value of the setting item posTarget to a setting value smaller than that of the setting item posN.

In step S1005, the system control unit 50 identifiably informs the user that the setting value of the setting item posTarget is corrected by the electronic apparatus. Specifically, the system control unit 50 displays the setting value of the setting item posTarget in a form different from uncorrected setting values, such as in red.

In step S1006, the system control unit 50 determines whether the setting value of the setting item posN is smaller than or equal to that of the setting item posTarget. If the setting value of the setting item posN is smaller than or equal to that of the setting item posTarget (YES in step S1006), the processing proceeds to step S1007. If not (NO in step S1006), the processing proceeds to step S1012. The case where the processing proceeds to step S1007 means that the relationship in magnitude is not maintained between the setting value of the setting item posN and that of the setting item posTarget, and the relationship in magnitude changes. By contrast, the case where the processing proceeds to step S1012 means that the relationship in magnitude is maintained between the setting value of the setting item posN and that of the setting item posTarget, and the setting value of the setting item posTarget does not need to be corrected.

In step S1007, the system control unit 50 determines whether the setting value of the setting item posTarget can be set to the setting value at the setting value cursor M−(N−Target). Specifically, the system control unit 50 determines whether there is a setting value corresponding to a setting value cursor that is smaller than the setting value cursor M by a value obtained by subtracting the numerical value of Target from N indicating the position of the item cursor 310. For example, suppose that N=3 and the setting value cursor M of the setting item pos3 is 2 (M=2). If Target=2 (setting item pos2), then (N−Target)=(3−2)=1. The setting value cursor M−(N−Target)=2−1=1. Since there is a setting value at the setting value cursor M=1, the determination of step S1007 is YES.

Suppose, for example, that N=3 and the setting value cursor M of the setting item pos3 is 1 (M=1). If Target=2 (setting item pos2), then (N−Target)=(3−2)=1. The setting value cursor M−(N−Target)=1−1=0. Since the setting value cursor M needs to be greater than or equal to 1, the determination of step S1007 is NO.

If the setting value of the setting item posTarget can be set to the setting value at the setting value cursor M−(N−Target) (YES in step S1007), the processing proceeds to step S1008. If not (NO in step S1007), the processing proceeds to step S1009.

In step S1008, the system control unit 50 corrects (changes) and sets the setting value of the setting item posTarget to the setting value at the setting value cursor M−(N−Target). By thus correcting the setting value of the setting item posTarget, the setting value of the setting item posTarget, which is greater than or equal to the setting value of the setting item posN, is reduced to maintain the relationship in magnitude between the setting value of the setting item posN and that of the setting item posTarget.

In step S1009, the system control unit 50 determines whether there is exception processing in which the setting value of the setting item posTarget does not need to be made smaller than that of the setting item posN. If there is exception processing (YES in step S1009), the processing proceeds to step S1010. If there is no exception processing (NO in step S1009), the processing proceeds to step S1012.

In step S1010, the system control unit 50 performs correction exception processing. The correction exception processing will be described below with reference to the flowchart of FIG. 11.

In step S1011, the system control unit 50 determines whether the correction exception processing is executed. If the correction exception processing is executed (YES in step S1011), the processing proceeds to step S1005. If the correction exception processing is not executed (NO in step S1011), the processing proceeds to step S1012.

In step S1012, the system control unit 50 determines whether correction is completed up to Target=N−1. If correction is not completed up to Target=N−1 (NO in step S1012), the processing proceeds to step S1013. If correction is completed up to Target=N−1 (YES in step S1012), the processing proceeds to step S1014.

In step S1013, the system control unit 50 sets Target=Target+1. The processing of steps S1002 to S1012 is thereby repeated until Target reaches N−1.

Next, the processing of steps S1014 to S1026 will be described. The processing of steps S1014 to S1026 is processing for correcting the setting values of setting items numbered with numbers greater than N indicating the position of the item cursor 310, or more specifically, the setting values of the setting items posN+1 to pos5 in response to the change of the setting value of the setting item posN.

In step S1014, the system control unit 50 initially sets Target=5.

In step S1015, the system control unit 50 determines whether the setting values are permitted to be corrected to the same values. This processing is similar to that of step S901. If the setting values are permitted to be corrected to the same values (YES in step S1015), the processing proceeds to step S1016. If not (NO in step S1015), the processing proceeds to step S1019.

In step S1016, the system control unit 50 compares the setting value of the setting item posN with that of the setting item posTarget. If the processing proceeds to step S1016 for the first time since the flowchart of FIG. 10 is started, Target is 5. The system control unit 50 compares the setting value of the setting item posN with that of the setting item pos5. The system control unit 50 determines whether the setting value of the setting item posN is greater than that of the setting item posTarget. If the setting value of the setting item posN is greater than that of the setting item posTarget (YES in step S1016), the processing proceeds to step S1017. If not (NO in step S1016), the processing proceeds to step S1025. The case where the processing proceeds to step S1017 means that the relationship in magnitude is not maintained between the setting value of the setting item posN and that of the setting item posTarget, and the relationship in magnitude changes. By contrast, the case where the processing proceeds to step S1025 means that the relationship in magnitude is maintained between the setting value of the setting item posN and that of the setting item posTarget, and the setting value of the setting item posTarget does not need to be corrected.

In step S1017, since the setting values are permitted to be corrected to the same values, the system control unit 50 corrects (changes) and sets the setting value of the setting item posTarget, which is a setting value smaller than that of the setting item posN, to the same value as the setting value of the setting item posN. However, this is not restrictive. The system control unit 50 may correct and set the setting value of the setting item posTarget to a setting value greater than that of the setting item posN.

In step S1018, the system control unit 50 identifiably notifies the user that the setting value of the setting item posTarget is corrected by the electronic apparatus. This processing is similar to that of step S1005.

In step S1019, the system control unit 50 determines whether the setting value of the setting item posN is greater than or equal to that of the setting item posTarget. If the setting value of the setting item posN is greater than or equal to that of the setting item posTarget (YES in step S1019), the processing proceeds to step S1020. If not (NO in step S1019), the processing proceeds to step S1025. The case where the processing proceeds to step S1020 means that the relationship in magnitude is not maintained between the setting value of the setting item posN and that of the setting item posTarget, and the relationship in magnitude changes. By contrast, the case where the processing proceeds to step S1025 means that the relationship in magnitude is maintained between the setting value of the setting item posN and that of the setting item posTarget, and the setting value of the setting item posTraget does not need to be corrected.

In step S1020, the system control unit 50 determines whether the setting value of the setting item posTarget can be set to the setting value at the setting value cursor M+(Target−N). Specifically, the system control unit 50 determines whether there is a setting value corresponding to a setting value cursor that is greater than the setting value cursor M by a value obtained by subtracting N indicating the position of the item cursor 310 from the numerical value of Target. For example, suppose N=3 and the setting value cursor M of the setting item pos3 is 15 (M=15). If Target=5 (setting item pos5), then (Target−N)=(5−3)=2. The setting value cursor M+(Target−N)=15+2=17. Since there is a setting value at the setting value cursor M=17, the determination of step S1020 is YES.

Suppose, for example, that N=3 and the setting value cursor M of the setting item pos3 is 16 (M=16). If Target=5 (setting item pos5), then (Target−N)=(5−3)=2. The setting value cursor M+(Target−N)=16+2=18. Since there is no setting value at the setting value cursor M=18, the determination of step S1020 is NO.

If the setting value of the setting item posTarget can be set to the setting value at the setting value cursor M+(Target−N) (YES in step S1020), the processing proceeds to step S1021. If not (NO in step S1020), the processing proceeds to step S1022.

In step S1021, the system control unit 50 corrects (changes) and sets the setting value of the setting item posTarget to the setting value at the setting value cursor M+(Target−N). By thus correcting the setting value of the setting item posTarget, the setting value of the setting item posTarget, which is smaller than or equal to the setting value of the setting item posN, is increased to maintain the relationship in magnitude between the setting value of the setting item posN and that of the setting item posTarget.

In step S1022, the system control unit 50 determines whether there is exception processing in which the setting value of the setting item posTarget does not need to be made greater than that of the setting item posN. If there is exception processing (YES in step S1022), the processing proceeds to step S1023. If there is no exception processing (NO in step S1022), the processing proceeds to step S1025.

In step S1023, the system control unit 50 performs correction exception processing. The correction exception processing will be described below with reference to the flowchart of FIG. 11.

In step S1024, the system control unit 50 determines whether the correction exception processing is executed. If the correction exception processing is executed (YES in step S1024), the processing proceeds to step S1018. If the correction exception processing is not executed (NO in step S1024), the processing proceeds to step S1025.

In step S1025, the system control unit 50 determines whether correction is completed up to Target=N+1. If correction is not completed up to Target=N+1 (NO in step S1025), the processing proceeds to step S1026. If correction is completed up to Target=N+1 (YES in step S1025), the processing of the flowchart of FIG. 10 ends. The processing returns to step S406 of FIG. 4.

In step S1026, the system control unit 50 sets Target=Target−1. The processing of steps S1015 to S1025 is thus repeated until Target reaches N+1.

Next, the correction exception processing will be described with reference to the flowchart of FIG. 11.

Figure 10B:
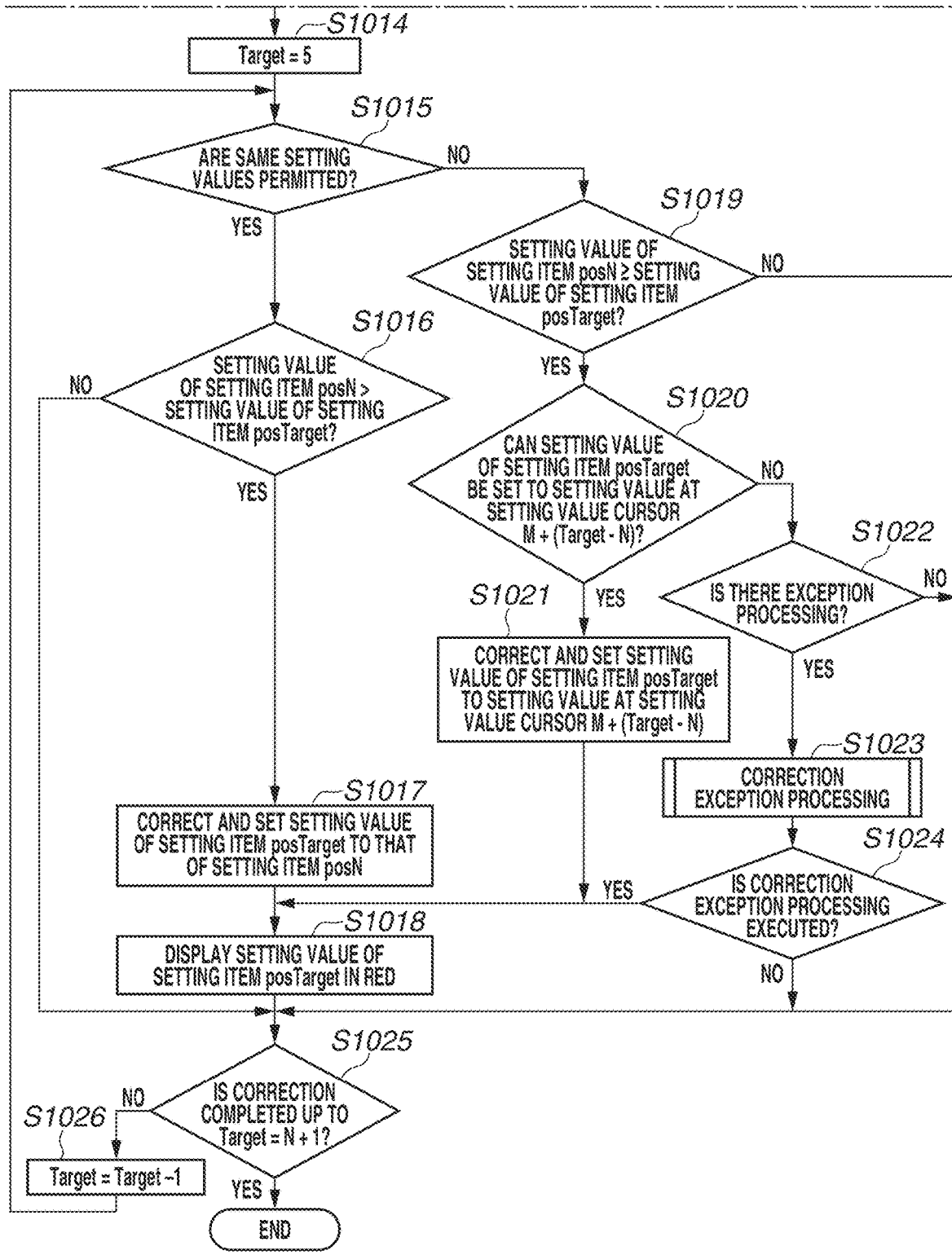
Figure 11:
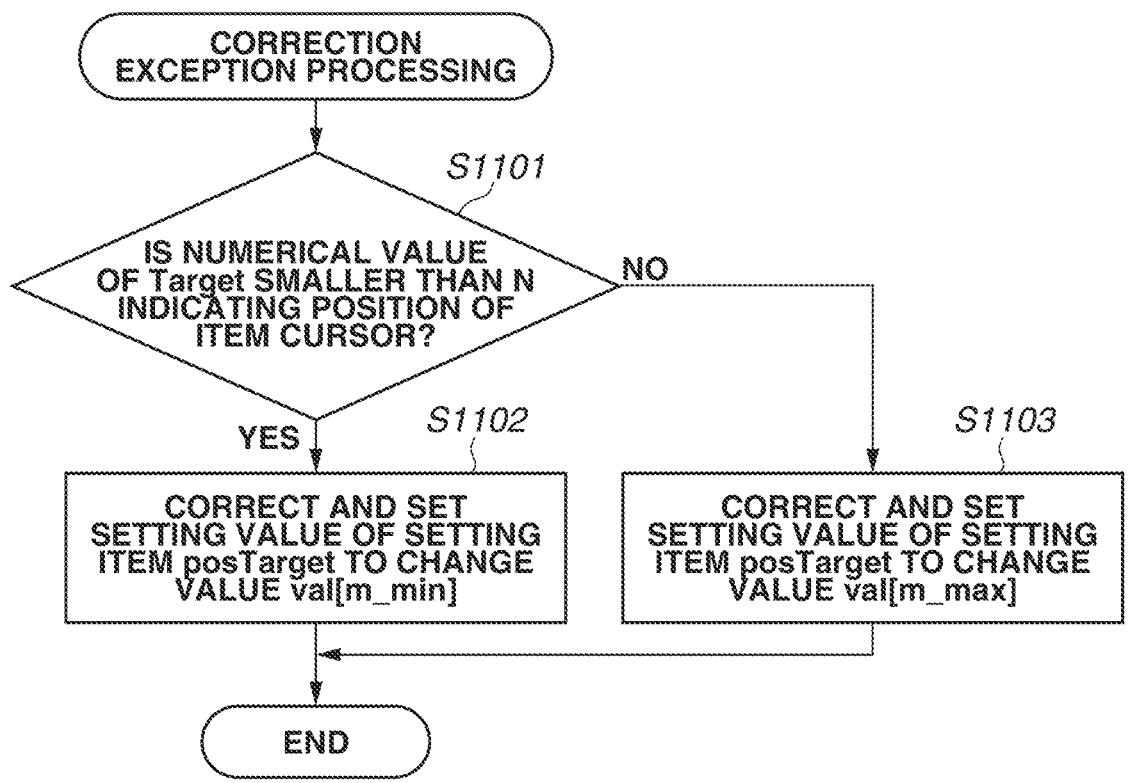
FIG. 11 is a flowchart of correction exception processing.

The flowchart of FIG. 11 corresponds to the correction exception processing in steps S1010 and S1023 of FIG. 10.

In step S1101, the system control unit 50 determines whether the numerical value of Target is smaller than that of N indicating the position of the item cursor 310. The system control unit 50 here checks whether the processing for correcting the setting value of the setting item posTarget to a value smaller than the setting value of the setting item posN (the processing of steps S1001 to S1013 in the flowchart of FIG. 10) is in progress. If the numerical value of Target is smaller than that of N indicating the position of the item cursor 310 (YES in step S1101), the processing proceeds to step S1102. On the other hand, if the numerical value of Target is not smaller than that of N indicating the position of the item cursor 310 (NO in step S1101), the processing proceeds to step S1103. In such a case, the processing for correcting the setting value of the setting item posTarget to a value greater than the setting value of the setting item posN is in progress.

In step S1102, the system control unit 50 corrects (changes) and sets the setting value of the setting item posTarget to the change value val[m_min].

In step S1103, the system control unit 50 corrects (changes) and sets the setting value of the setting item posTarget to the change value val[m_max].

Then, the processing of the flowchart of FIG. 11 ends. The processing proceeds to step S1011 or S1024 of FIG. 10.

Next, examples where the setting value of the setting item posTarget is corrected will be described with reference to FIGS. 12A to 12K.

FIGS. 12A to 12C are diagrams illustrating an example in which, when the setting value of the setting item pos3 is changed, the setting value of another setting item is changed. Suppose, as illustrated in FIG. 12A, that the user changes a setting value 1201*a* of the setting item pos3 to a setting value 1201*b* that is smaller than the setting value of the setting item pos2.

FIG. 12B is a diagram illustrating the correction processing when same values are permitted. As illustrated in FIG. 12B, a setting value 1202*a* of the setting item pos2 is corrected to a value 1202*b* that is the same as the setting value 1201*b* of the setting item pos3 in response to the change in the setting value of the setting item pos3. Such correction processing corresponds to the processing of step S1004 in FIG. 10.

FIG. 12C is a diagram illustrating the correction processing when same values are not permitted. As illustrated in FIG. 12C, the setting value 1202*a* of the setting item pos2 is corrected to a value 1202*c* that is smaller than the setting value 1201*b* of the setting item pos3 in response to the change in the setting value of the setting item pos3. Such processing corresponds to the processing of step S1008 in FIG. 10.

FIGS. 12D to 12F are diagrams illustrating an example in which, when the setting value of the setting item pos4 is changed, the setting values of a plurality of other setting items are changed. Suppose, as illustrated in FIG. 12D, that the user changes a setting value 1203*a* of the setting item pos4 to a setting value 1203*b* that is smaller than the setting value of the setting item pos2. Since the relationship in magnitude is not maintained between the setting values of the setting items pos2 to pos4, the setting values of the setting items pos2 and pos3 need to be corrected.

FIG. 12E is a diagram illustrating the correction processing when same values are permitted. As illustrated in FIG. 12E, a setting value 1204*a* of the setting item pos2 is corrected to a value 1204*b* that is the same as the setting value 1203*b* of the setting item pos4 in response to the change in the setting value of the setting item pos4. A setting value 1205*a* of the setting item pos3 is corrected to a value 1205*b* that is the same as the setting value 1203*b* of the setting item pos4. Such correction processing corresponds to a case where the processing of step S1004 in FIG. 10 is performed a plurality of times with different values of Target.

FIG. 12F is a diagram illustrating the correction processing when same values are not permitted. As illustrated in FIG. 12F, the setting value 1204*a* of the setting item pos2 is corrected to a value 1204*c* that is smaller than the setting value 1203*b* of the setting item pos4 in response to the change in the setting value of the setting item pos4. The setting value 1205*a* of the setting item pos3 is corrected to a value 1205*c* that is smaller than the setting value 1203*b* of the setting item pos4. Such processing corresponding to a case where the processing of step S1008 in FIG. 10 is performed a plurality of times with different values of Target.

FIGS. 12G to 12I are diagrams illustrating an example in which the correction exception processing is performed when the setting value of the setting item pos3 is changed. Suppose, as illustrated in FIG. 12G, that the user changes a setting value 1206*a* of the setting item pos3 to a setting value 1206*b* that is greater than the setting value of the setting item pos1 by one and smaller than the setting value of the setting item pos2. Since the relationship in magnitude with the setting value of the setting item pos2 is not maintained, the setting value of the setting item pos2 needs to be corrected.

FIG. 12H is a diagram illustrating the correction processing when same values are permitted. As illustrated in FIG. 12H, a setting value 1207*a* of the setting item pos2 is corrected to a value 1207*b* that is the same as the setting value 1206*b* of the setting item pos3 in response to the change in the setting value of the setting item pos3. Such correction processing corresponds to the processing of step S1004 in FIG. 10.

FIG. 12I is a diagram illustrating the correction processing when same values are not permitted. In response to the change in the setting value of the setting item pos3, the setting value of the setting item pos2 is supposed to be corrected so that the setting value of the setting item pos1<the setting value of the setting item pos2<the setting value of the setting item pos3. However, such settings are not available since the setting value of the setting item pos1 and the setting value of the setting item pos3 differ only by one. The setting value 1207*a* of the setting item pos2 is then corrected to a minimum value 1207*c* by the correction exception processing. Such processing corresponds to the correction processing in step S1102 of FIG. 11, where the processing has proceeded from step S1007 of FIG. 10 to step S1009 due to the unavailability of the settings (NO in step S1007) and proceeded further from step S1009 to step S1010.

FIGS. 12J and 12K are diagrams illustrating an example in which the correction exception processing is performed when the setting value of the setting item pos3 is changed. Suppose, as illustrated in FIG. 12J, that the user changes a setting value 1208*a* of the setting item pos3 to a maximum possible value 1208*b* of the setting value. Since the relationship in magnitude with the setting values of the setting items pos4 and pos5 is not maintained, the setting values of the setting items pos4 and pos5 need to be corrected.

FIG. 12K is a diagram illustrating the correction processing when same values are not permitted. In response to the change in the setting value of the setting item pos3, the setting values of the setting items pos4 and pos5 are supposed to be corrected so that the setting value of the setting item pos3<the setting value of the setting item pos4<the setting value of the setting item pos5. However, such settings are not available since the setting value 1208*b* of the setting item pos3 is the maximum value. A setting value 1209*a* of the setting item pos4 and the setting value of the setting item pos5 are then corrected to the same values as the setting value 1208*b* of the setting item pos3, i.e., maximum values 1209*b* and 1210*a* by the correction exception processing. As far as the setting value of the setting item pos5 is concerned, such processing corresponds to the correction processing in step S1103 of FIG. 11, where the processing has proceeded from step S1020 of FIG. 10 to step S1022 due to the unavailability of the setting (NO in step S1020) and proceeded further from step S1022 to step S1023. As for the setting value of the setting item pos4, such processing also corresponds to the correction processing in step S1103 of FIG. 11, where the processing has proceeded from step S1020 of FIG. 10 to step S1022 due to the unavailability of the setting (NO in step S1020) and proceeded further from step S1022 to step S1023.

As described above, according to the present exemplary embodiment, the amount of operation by the user is displayed on the setting screen for setting a setting value based on the amount of operation. The user can thus identify the relationship between the amount of operation and the setting value on the setting screen.

If the amount of operation actually made on the operation member is not known from the setting screen for setting the magnitude (setting value) of the function to be executed based on the amount of operation, the user has difficulty in finding out how much amount of operation would result in execution of the currently-set setting value. After the setting of the setting value, if the setting value corresponding to the amount of operation assumed by the user is too small or too large, the zoom speed can be higher than or lower than expected by the user. In addition, since the setting values are set based on the respective plurality of levels of the amount of operation, the user is unable to find out the timing at which the setting values to be executed are switched, either, if the magnitude of the amount of operation is unknown. In actual operation, the setting value of the executed function can thus change unintentionally. By contrast, if the amount of operation is known from the setting screen, the user can find out the relationship between the amount of operation and the magnitude of the setting value in advance, and can thus make operations closer to his/her intention.

According to the present exemplary embodiment, the user sets setting values corresponding to respective amounts of operation that have a relationship in magnitude. If the relationship in magnitude between the set setting values is reverse to the relationship in magnitude between the corresponding amounts of operation, adjustments are made to maintain the relationship in magnitude between the setting values. In setting different setting values based on the magnitude of the amount of operation, the relationship in magnitude between the amounts of operation and the relationship in magnitude between the corresponding setting values can thus be prevented from being reverse to each other. Specifically, adjustments are made so that the greater the amount of operation, the greater the magnitude of the set setting value, and the smaller the amount of operation, the smaller the magnitude of the set setting value. This prevents the setting value of the function to be executed, such as the zoom speed, from fluctuating if the user increases the amount of operation. Suppose that the zoom speed is set based on the amount of depression (amount of operation), as is the case with zoom levers. In such a case, an intuitive operation can be made if the zoom speed increases as the amount of depression increases, i.e., the amount of depression and the function to be executed coincide in terms of the relationship in magnitude. Suppose that the zoom speed increases gradually as the user depresses the zoom lever more, and then the zoom speed decreases as the user depresses the zoom lever even further. In such a case, the amount of operation and the setting value do not coincide in terms of the relationship in magnitude, and intuitive operations can be difficult. Intuitive user operations can be made if, when the user sets the setting values, the setting values are adjusted so that the relationship in magnitude between the amounts of operation and the relationship in magnitude between the setting values do not unintentionally become reversed.

If a setting value corresponding to a first amount of operation is changed based on the user's operation, and the relationship in magnitude with the setting value of a second setting item corresponding to a second amount of operation becomes reverse to the relationship in magnitude between the amounts of operation, the setting value of the second setting item is changed. A setting value according to the user's demand can thus be set by maintaining the setting value changed by the user and changing other setting values to maintain the relationship in magnitude. According to the present exemplary embodiment, the setting values are adjusted to maintain the relationship in magnitude between the setting-changed setting value and the preceding and subsequent ones. If the user sets a setting value such that the preceding and subsequent setting values are also changeable, the user does not need to re-set either of the preceding and subsequent setting values in response to the change of the setting value. If the setting value of one setting item is changed, the setting values of a plurality of items for which a setting value greater than (or smaller than) that of the setting-changed setting item needs to be set are all changed. The user therefore does not need to adjust each individual setting value. Such setting values are adjusted even if the user is not aware that the relationship in magnitude between the setting values has changed from before the change of the setting value due to the change of the setting value by the user. This can reduce the possibility that the relationship in magnitude changes unintentionally.

In the foregoing description, if the relationship in magnitude between the setting values changes due to an instruction to change the setting value of a setting item, the setting value of the setting item of which the setting value is instructed to be changed is changed based on the instruction and the setting values of the preceding and subsequent setting items are changed (adjusted) so that the relationship in magnitude is maintained. However, the present exemplary embodiment is not limited thereto. To maintain the relationship in magnitude between the setting values, the settable ranges of setting values of the preceding and subsequent setting items may be changed so that the user can only select a setting value that maintains the relationship in magnitude between the setting values.

For example, suppose, as illustrated in FIG. 12A, in a case where the user changes the setting value 1201a of the setting item pos3 to a setting value of "3" which is smaller than the setting value of the setting item pos2, and if same values are permitted, the system control unit 50 performs control to change the range of the setting value of the setting item pos2 into one having an upper limit of "3", whereby the setting value is restricted so that only "1" to "3" can be selected. That is, the number of selectable setting values becomes smaller than the number of setting values that used to be selectable as the setting value of the setting item pos2 before the instruction to change the setting value of the setting item pos3 is given. Similarly, the system control unit 50 performs control to change the range of the setting value of the setting item pos1 into one having an upper limit of "3". The setting value is thereby restricted so that only "1" to "3" can be selected, i.e., only setting value candidates smaller than the setting value of the setting item pos3 can be selected. For example, if the user operates the up key to change the setting value of the setting item pos2, the system control unit 50 may preclude the setting value from moving to "4" or above. The system control unit 50 may hide or gray out the setting values of "4" and above. Similarly, if the user changes the setting value 1201a of the setting item pos3 to a greater setting value, the system control unit 50 can change the ranges of the setting values of the setting items pos4 and pos5 into ones having the user-changed setting value as a lower limit.

If same values are not permitted, the system control unit 50 performs control to change the range of the setting value of the setting item pos2 into one having an upper limit of "2", and performs control to change the range of the setting value of the setting item pos1 into one having an upper limit of "1". For example, if the user operates the up key to change the setting value of the setting item pos2, the system control unit 50 may preclude the setting value from moving to "3" or above. The system control unit 50 may hide or gray out the setting values of "3" and above. Similarly, if the user changes the setting value 1201a of the setting item pos3 to a greater setting value, the ranges of the setting values of the setting items pos4 and pos5 can be changed into ones having a setting value greater than the user-changed setting value as a lower limit.

In such a manner, by limiting the settable ranges of the setting values of the setting items, an erroneous setting value that changes the relationship in magnitude can be prevented from being set.

In the present exemplary embodiment, the operation device is described to be the grip zoom 104 and the amount of operation is described to be the amount of depression of the grip zoom 104. Since the grip zoom 104 is continuously depressed during operation in a seamless manner between different amounts of depression, the user has difficulty in identifying the amount of depression of the grip zoom 104. Even if the operation device is a seamless one in terms of the amount of operation, displaying the amount of operation during an actual operation enables the user to identify the actual amount of operation and assign a function.

In the present exemplary embodiment, the operation device is described to be the grip zoom 104. However, the operation device is not limited to the grip zoom 104. For example, the operation device may be a movable one including a horizontally-rotatable or vertically-movable operation portion. In such a case, the system control unit 50 detects the amount of movement of the operation portion moved from a reference position by the user's operation as the amount of operation.

In the present exemplary embodiment, the function assigned to the amount of operation is described to be the zoom speed. However, this is not restrictive. The function may be a speed at which an image displayed on the display unit 103 is enlarged or reduced, i.e., the speed of an electronic zoom.

In the first exemplary embodiment, the electronic apparatus is described to be the camera 10 that identifiably displays the amount of depression when the grip zoom 104 is depressed by the user. A second exemplary embodiment describes a case in which the electronic apparatus is a non-portable game console (game system) 20. The non-portable game console 20 includes a game apparatus 30 and a controller 40 serving as an operation device/member. In the present exemplary embodiment, the game apparatus 30 functions as a display control apparatus. The controller 40 includes an acceleration sensor. Swing speed when the user swings the controller 40 is identifiably displayed on a setting screen as an amount of operation.

Figure 13A:
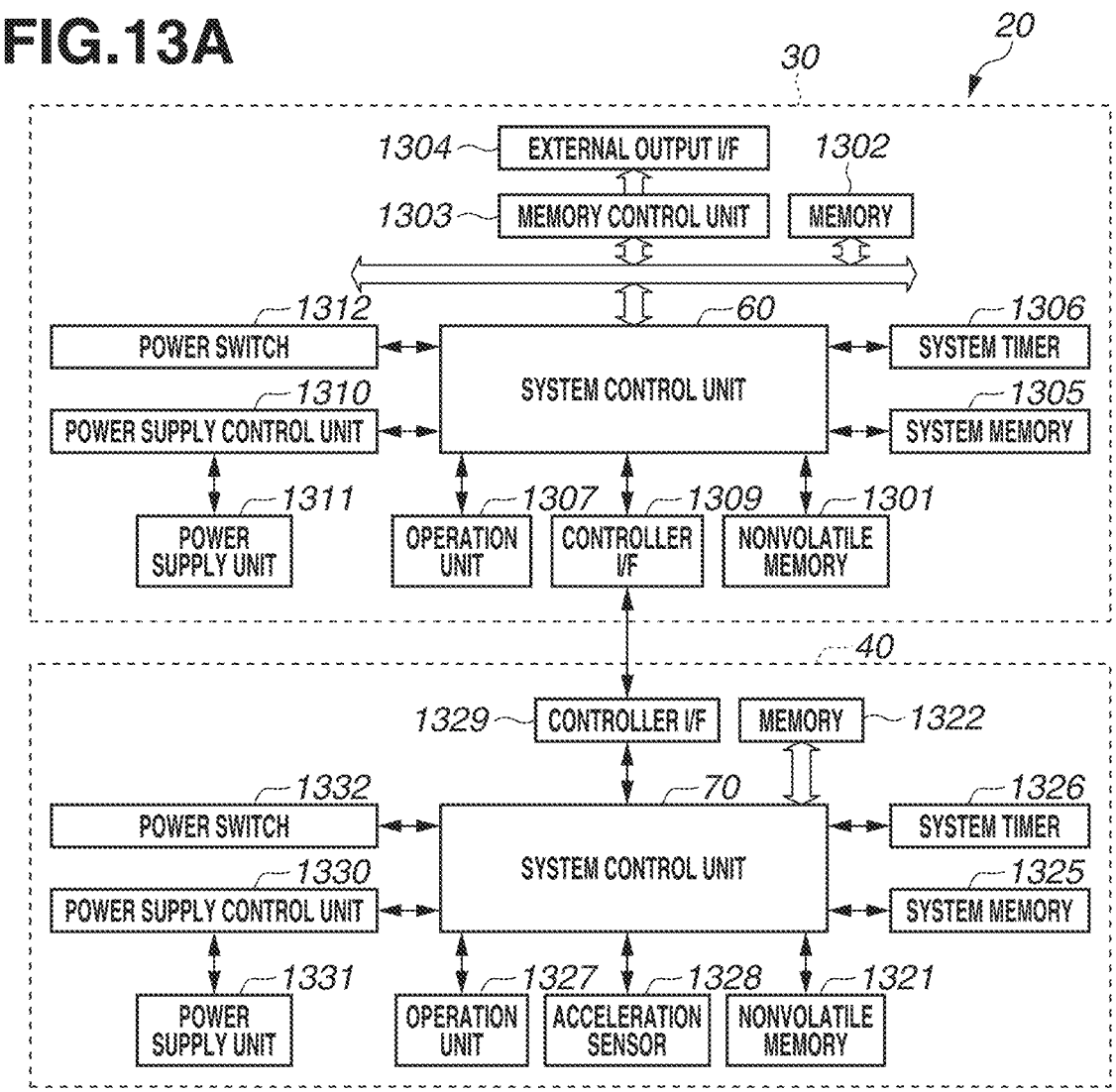
FIGS. 13A and 13B illustrate a configuration example of a non-portable game console according to a second exemplary embodiment.

FIG. 13A is a diagram illustrating an example of configuration of the game apparatus 30 and the controller 40.

The game apparatus 30 controls screen display based on operations made by the user via the controller 40. The following description deals with a configuration needed to implement the processing of the game console 20 to be described below. A description of, for example, a method for switching game software and a method for activating game software will be omitted. In the present exemplary embodiment, a baseball game will be described as an example of game software.

The game apparatus 30 and the controller 40 include a system control unit 60 and a system control unit 70, respectively. The system control units 60 and 70 control the entire game console 20, the game apparatus 30, or the controller 40 each.

Nonvolatile memories 1301 and 1321 are memories serving as electrically erasable and recordable recording media. For example, EEPROMs are used. The nonvolatile memories 1301 and 1321 store operation constants and programs of the system control unit 60 and 70, respectively. The programs are for executing flowcharts of the present exemplary embodiment to be described below. The system control units 60 and 70 implement the processing of the present exemplary embodiment by executing the programs stored in the nonvolatile memories 1301 and 1321, respectively. The nonvolatile memory 1301 of the game apparatus 30 contains software for executing a game.

Memories 1302 and 1322 have a storage capacity sufficient to display images and store audios. Display image data written to the memory 1302 is output from an external output I/F 1304 via a memory control unit 1303. The external output I/F 1304 is an output I/F for displaying a video image on an external apparatus such as a television set (TV). Examples of the external output I/F 1304 include HDMI and a video output. The memory control unit 1303 performs data conversion for output to the external output I/F 1304. The controller 40 does not output image data, and therefore does not include the memory control unit 1303 or the external output I/F 1304.

System memories 1305 and 1325 include a RAM, for example. The system memories 1305 and 1325 store operation constants of the system control units 60 and 70, variables, and programs read from the nonvolatile memories 1301 and 1321, respectively. System timers 1306 and 1326 are clocking units that measure time used for various types of control and the time of a built-in clock.

An operation unit 1307 of the game apparatus 30 includes various buttons such as a menu button, a cancel button, a directional pad, and a set button. For example, if the user operates the menu button, a menu screen that allows the user to make various settings is output to the external output I/F 1304. An operation unit 1327 of the controller 40 includes a directional pad, a set button, a first operation button, and a second operation button. The first operation button and the second operation button are general-purpose buttons, which are operated when the user plays a game. The controller 40 includes an acceleration sensor 1328. The acceleration sensor 1328 detects speed (swing speed) of operation when the user swings the controller 40. Specifically, the acceleration sensor 1328 outputs a voltage based on the acceleration of the controller 40 to the system control unit 70. The system control unit 70 obtains the voltage from the acceleration sensor 1328 and converts the obtained voltage into speed.

Controller I/Fs 1309 and 1329 communicably connect the game apparatus 30 and the controller 40. The controller I/F 1329 transmits an operation condition of the controller 40 to the game apparatus 30. For example, the system control unit 70 transmits information about speed when the user swings the controller 40 to the game apparatus 30. The controller I/Fs 1309 and 1329 may be either wired or wireless.

Power supply control units 1310 and 1330 each include a battery detection circuit, a DC-DC converter, and a switch circuit for switching blocks to be energized, and detect the present or absence of a battery attached, the type of the battery, and the remaining battery level. The power supply control units 1310 and 1330 control the DC-DC converters based on the detection results and instructions from the system control units 60 and 70, and supply various parts with needed voltages for needed periods.

Power supply units 1311 and 1331 each are a primary battery such as an alkaline battery and a lithium battery, a secondary battery such as a NiCd battery, a NiMH battery, and a Li battery, or an AC adaptor. The power supply unit 1311 of the game apparatus 30 and the power supply unit 1331 of the controller 40 have different configurations.

Power switches 1312 and 1332 are push buttons for switching power on and off.

Figure 13B:
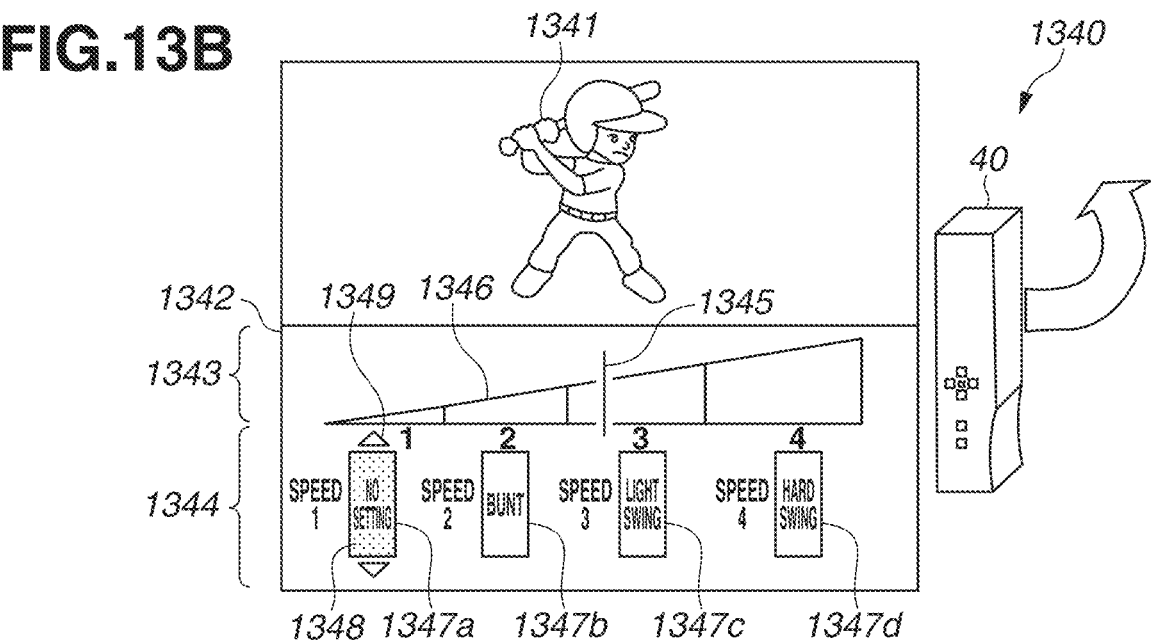

FIG. 13B is a diagram illustrating an example of a function setting screen 1340. If the user selects a function setting mode from the menu screen via the controller 40, the system control unit 60 outputs the function setting screen 1340 from the external output I/F 1304. The function setting screen 1340 is a screen intended for the user to make settings to assign character actions (functions) to swing speeds (amounts of operation) of the controller 40.

The function setting screen 1340 displays an appearance of the controller 40, a character 1341, and a function setting menu 1342. The function setting screen 1340 here shows that swinging the controller 40 in the direction of the arrow makes the character 1341 swing the bat.

In the present exemplary embodiment, the function setting menu 1342 allows the user to set the action of the character 1341 by selecting any one of "no setting", "bunt", "light swing", and "hard swing" for a swing speed when the controller 40 is swung.

The function setting menu 1342 includes a first display section 1343 and a second display section 1344 on the same screen.

The first display section 1343 identifiably displays the swing speed when the controller 40 is swung. The first display section 1343 displays an indicator 1345 and a swing level display 1346. The indicator 1345 is a display item indicating the swing speed. The swing level display 1346 is a display item indicating four levels for identification of the swing speed indicated by the indicator 1345. The system control unit 60 displays the indicator 1345 based on the swing speed received from the controller 40.

The second display section 1344 identifiably displays functions assigned to swing speeds. The second display section 1344 displays functions 1347a to 1347d corresponding to four levels of speed positions D, an item cursor 1348, and up/down key items 1349. The four levels of speed positions D correspond to an example of respective setting items. The functions 1347a to 1347d correspond to an example of respective setting values, and indicate "no setting", "bunt", "light swing", and "hard swing", respectively. For example, a function "no setting" is assigned to a speed position D "speed 1". A function "bunt" is assigned to a speed position D "speed 2". A function "light swing" is assigned to a speed position D "speed 3". A function "hard swing" is assigned to a speed position D "speed 4".

Figure 14:
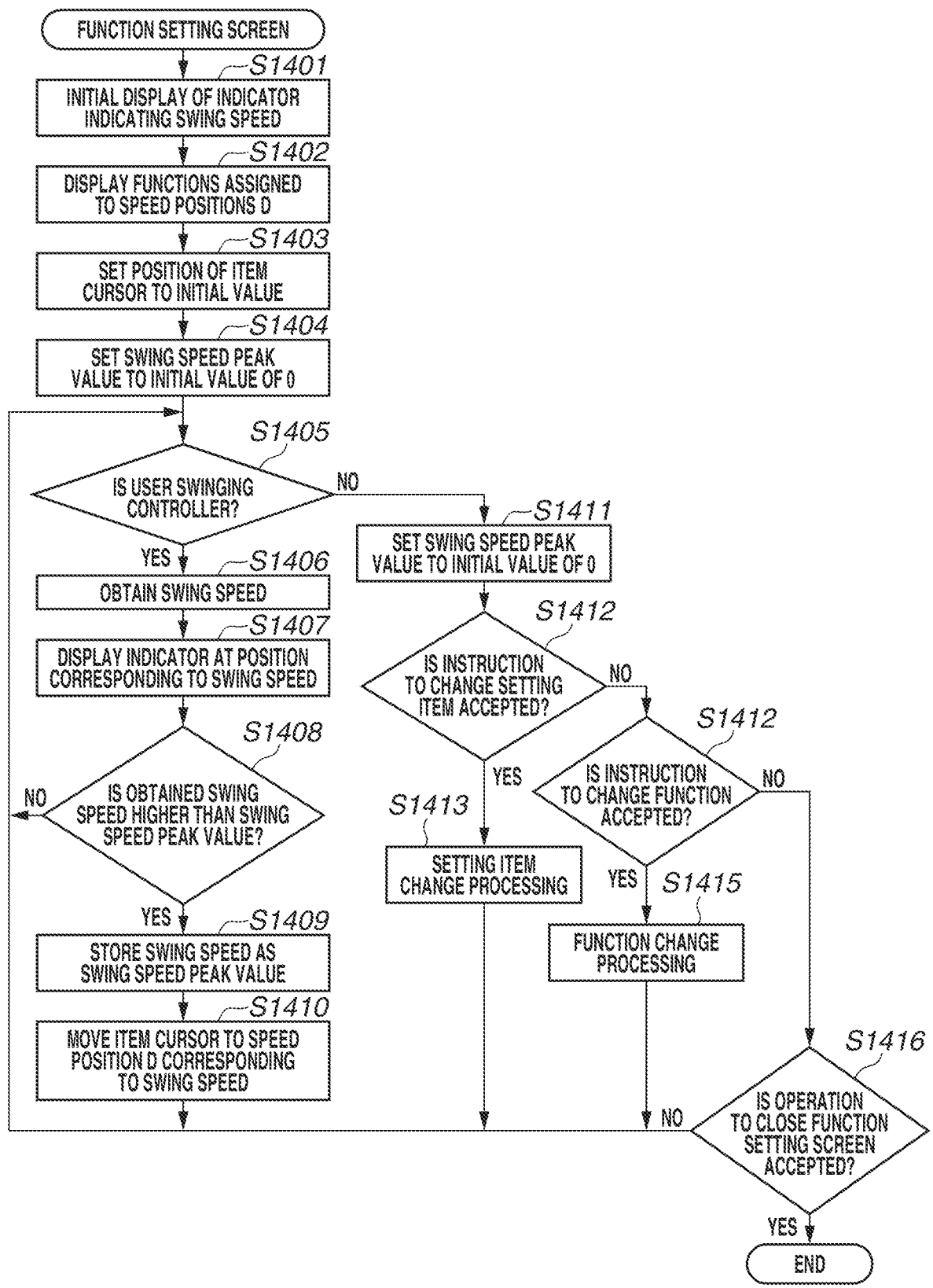
FIG. 14 is a flowchart of display processing of a function setting screen.

Next, processing from a display to an end of the function setting screen 1340 will be described with reference to the flowchart of FIG. 14. The flowchart of FIG. 14 is implemented by the system control unit 60 reading the program stored in the nonvolatile memory 1301, loading the program into the system memory 1305, and executing the program. The flowchart of FIG. 14 is started by the user selecting the function setting mode from the menu screen. A description of processing similar to that of the first exemplary embodiment will be omitted as appropriate.

In step S1401, the system control unit 60 displays the function setting screen 1340. Specifically, the system control unit 60 displays the function setting screen 1340 including the function setting menu 1342 of FIG. 13B, and provides an initial display of the indicator 1345 indicating the swing speed.

In step S1402, the system control unit 60 displays the functions (character actions) assigned to the speed positions D. Specifically, the system control unit 60 reads information that associates the speed positions D with the functions from the nonvolatile memory 1301, and displays the functions 1347a to 1347d assigned to the speed positions D "speed 1" to "speed 4" as illustrated in the second display section 1344 of FIG. 13B.

In step S1403, the system control unit 60 sets the position of the item cursor 1348 to an initial value. Specifically, as illustrated in FIG. 13B, the system control unit 60 displays the item cursor 1348 at the speed position D "speed 1".

In step S1404, the system control unit 60 sets a swing speed peak value to an initial value of 0. The swing speed peak value is a variable used in determining whether a maximum speed to be used in subsequent processing is updated. The system control unit 60 stores the variable into the system memory 1305.

In step S1405, the system control unit 60 determines whether the user is swinging the controller 40. If the user is swinging the controller 40 (YES in step S1405), the processing proceeds to step S1406. If the user is not swinging the controller 40 (NO in step S1405), the processing proceeds to step S1411. The system control unit 60 determines that the user is swinging the controller 40 if the information about the swing speed received from the controller 40 is not 0.

In step S1406, the system control unit 60 obtains the swing speed. The system control unit 60 converts the obtained swing speed into a level value of speed 1 to 4. The correspondence between the swing speed and the level values of speeds 1 to 4 is stored in the nonvolatile memory 1301 in advance in association with each other.

In step S1407, the system control unit 60 displays the indicator 1345 at a position corresponding to the swing speed. The user can thus easily identify the swing speed when swinging the controller 40.

In step S1408, the system control unit 60 determines whether the obtained swing speed is higher than the swing speed peak value. The system control unit 60 here compares the swing speed peak value with the level value of speed 1 to 4 converted in step S1406. If the obtained swing speed is higher (YES in step S1408), the processing proceeds to step S1409. If the obtained swing speed is not higher (NO in step S1408), the processing returns to step S1405. If the processing proceeds to step S1408 for the first time since the flowchart of FIG. 14 is started, the swing speed peak value is 0. The swing speed is then determined to be higher than the swing speed peak value (YES in step S1408), and the processing proceeds to step S1409.

In step S1409, the system control unit 60 stores the obtained swing speed as the swing speed peak value in the system memory 1305. Here, the level value of speed 1 to 4 converted in step S1406 is stored as the swing speed peak value. For example, in FIG. 13B, the level value of the swing speed is "3", and "3" is stored as the swing speed peak value.

In step S1410, the system control unit 60 moves and displays the item cursor 1348 at the speed position D corresponding to the swing speed among the speed positions D "speed 1" to "speed 4". For example, if the level value of the obtained swing speed is "3", the system control unit 60 moves and displays the item cursor 1348 at the speed position D "speed 3" (position displayed as "light swing"). In such a manner, if the controller 40 is swung at a swing speed corresponding to a speed position D, the item cursor 1348 moves to the speed position D. The user can thus easily perform the operation of assigning a function to a swing speed since the user does not need to check the swing speed by himself/herself and then make an operation to move the item cursor 1348. The processing then returns to step S1405.

In step S1411, the system control unit 60 sets the swing speed peak value to the initial value of 0.

In step S1412, the system control unit 60 determines whether an instruction to change the setting item is accepted. Specifically, if the user operates a right or left key of the operation unit 1327 of the controller 40 with the item cursor 1348 located at any one of the speed positions D "speed 1" to "speed 4", the system control unit 60 determines that an instruction to change the setting item is accepted.

In step S1413, the system control unit 60 performs setting item change processing. Specifically, the system control unit 60 moves the item cursor 310 located at any one of the speed positions D "speed 1" to "speed 4" based on the operation on the left or right key, and displays the moved item cursor 310.

In step 1414, the system control unit 60 determines whether an instruction to change the function at the speed position D is accepted. Specifically, if the user operates an up or down key of the operation unit 1327 of the controller 40 with the item cursor 1348 located at any one of the speed positions D "speed 1" to "speed 4", the system control unit 60 determines that an instruction to change the function is accepted. If an instruction to change the function is accepted (YES in step S1414), the processing proceeds to step S1415. If no instruction to change the function is accepted (NO in step S1414), the processing proceeds to step S1416.

In step S1415, the system control unit 60 performs function change processing. For example, the system control unit 60 changes the function corresponding to the speed position D to "no setting", "bunt", "light swing", or "hard swing" based on the operation on the up or down key. If the function is changed from "light swing" to "hard swing", the system control unit 60 controls the character 1341 to make a "hard swing" action when the controller 40 is swung at a swing speed corresponding to the speed position D. The processing then returns to step S1405.

In step S1416, the system control unit 60 determines whether an operation to close the function setting screen 1340 is accepted. If an operation to close the function setting screen 1340 is accepted (YES in step S1416), the system control unit 60 ends displaying the function setting screen 1340, and the processing of the flowchart of FIG. 14 ends. When closing the function setting screen 1340, the system control unit 60 stores the speed positions D and the functions into the nonvolatile memory 1301 in association with each other. On the other hand, if no operation to close the function setting screen 1340 is accepted (NO in step S1416), the processing returns to step S1405. The system control unit 60 then repeats the foregoing processing.

As describe above, according to the present exemplary embodiment, the system control unit 60 detects the amount of operation when the user makes an operation, and performs control to display the detected amount of operation on a setting screen. The user can easily identify the amount of operation of the actual operation by visually observing the setting screen. The user can thus identify the actual amount of operation before assigning a function. In the present exemplary embodiment, the operation device is described to be the controller 40, and the amount of operation is described to be the swing speed when the controller 40 is swung. However, the operation device is not limited to the controller 40. For example, the operation device may be a movable one including a horizontally-rotatable or vertically-movable operation portion. The operation device may be a three-dimensional (3D) stick. The swing speed is described to be detected by using the acceleration sensor 1328. However, this is not restrictive. A detection device capable of position detection may be used.

In the first exemplary embodiment, the case of correcting the zoom speeds, or setting values, is described by using a relationship in magnitude such that the zoom speeds increase in order of the setting items or depression positions D "post" to "pos5" as an example. A third exemplary embodiment describes a case of correcting the setting values of setting items having a different relationship in magnitude.

FIG. 15A-1 is a diagram illustrating an example of a setting screen for setting a voltage value of a monitored power supply voltage to issue a warning and a voltage value to forcefully power off the apparatus. Here, setting items are a "warning voltage setting" and a "power-off voltage setting". Voltage values 1505 and 1506 are set as respective setting values. Since a warning needs to be issued before power-off, the "warning voltage setting" and the "power-off voltage setting" have a relationship in magnitude such that the voltage value of the "warning voltage setting" is greater than that of the "power-off voltage setting".

Figures 3, 15A:
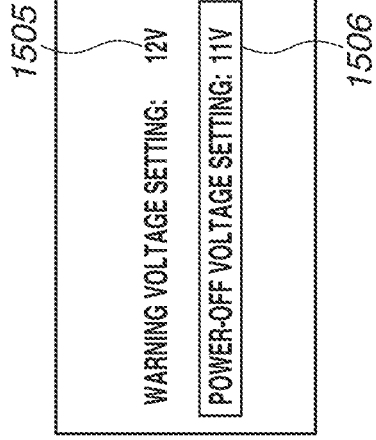

Suppose, as illustrated in FIG. 15A-2, that the user changes the voltage value of the "power-off voltage setting" to a voltage value 1507. In such a case, the relationship in magnitude between the voltage value of the "warning voltage setting" and that of the "power-off voltage setting" changes. As illustrated in FIG. 15A-3, the voltage value of the "warning voltage setting" is then corrected to a voltage value 1508 such that the relationship in magnitude is maintained between the voltage value of the "warning voltage setting" and that of the "power-off voltage setting". In such a manner, the correction processing according to the first exemplary embodiment can be applied also in a case where the setting values having a numerical relationship in magnitude are changed.

Figures 1, 15B:
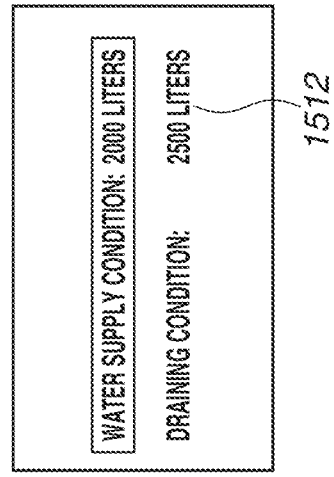
Figures 2, 15B:
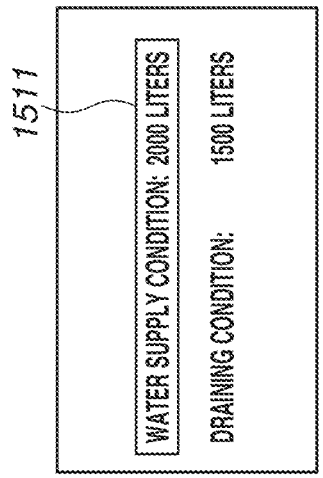
Figures 3, 15B:
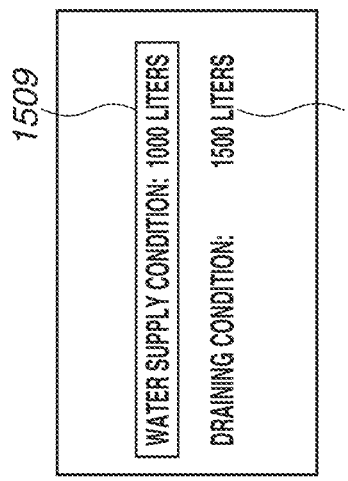

FIG. 15B-1 is a diagram illustrating an example of a setting screen for setting the quantities of water to be supplied to and drained from a water-storing dam or tank. Here, setting items are a "water supply condition" and a "draining condition". Quantities of water 1509 and 1510 are set as respective setting values. Since processing is such that water is supplied if the quantity of water is small and water is drained if the quantity of water is large, the "water supply condition" and the "draining condition" have a relationship in magnitude such that the quantity of water of the "water supply condition" is smaller than that of the "draining condition".

Suppose, as illustrated in FIG. 15B-2, that the user changes the quantity of water of the "water supply condition" to a quantity of water 1511. In such a case, the relationship in magnitude between the "water supply condition" and the "draining condition" changes. As illustrated in FIG. 15B-3, the quantity of water of the "draining condition" is therefore corrected to a quantity of water 1512 such that the relationship in magnitude is maintained between the quantity of water of the "water supply condition" and that of the "draining condition". In such a manner, the correction processing according to the first exemplary embodiment can be applied also in a case where the setting values having a numerical relationship in magnitude are changed.

As described above, according to the present exemplary embodiment, if a relationship in magnitude between the setting value of a first setting item and that of a second setting item changes as the setting value of the first setting item is changed, the setting value of the second setting item is changed to maintain the relationship in magnitude. This can prevent the setting values of the setting items having a relationship in magnitude from being set to erroneous setting values that change the relationship in magnitude.

In the present exemplary embodiment, the setting values having a relationship in magnitude are described to be numerical values. However, this is not restrictive. For example, setting values having a relationship in magnitude may be dates, areas, volumes, and times. Setting values having a relationship in magnitude may be ones that are comparable in terms of high or low, upper or lower, strong or weak, or superior or inferior.

While the exemplary embodiments of the present invention have been described above, the present invention is not limited to such specific exemplary embodiments, and various modes not departing from the gist of the invention are also included in the present invention. The foregoing exemplary embodiments merely demonstrate some of the exemplary embodiments of the present invention, and such exemplary embodiments can be combined as appropriate.

The foregoing various types of control described to be performed by the system control units 50 and 60 may be performed by a single piece of hardware. A plurality of pieces of hardware may share the processing to control the entire electronic apparatus.

The foregoing exemplary embodiments of the present invention are described to be applied to the camera 10 or the game console 20. However, this is not restrictive. An exemplary embodiment of the present invention is applicable to any electronic apparatus in which setting values having a relationship in magnitude are set. More specifically, an exemplary embodiment of the present invention can be applied to a personal computer, a personal digital assistant (PDA), a mobile phone terminal, a portable image viewer, and a printer apparatus including a display. An exemplary embodiment of the present invention can also be applied to a digital photo frame, a music player, a game console, an electronic book reader, a tablet terminal, a smartphone, a projection apparatus, and home appliances and vehicle-mounted devices including a display.

The foregoing exemplary embodiments of the present invention are described to be applied to the camera 10 or the game console 20. However, this is not restrictive. An exemplary embodiment of the present invention is applicable to any display control apparatus that displays a setting screen for assigning functions to amounts of operation of an operation unit for a user to operate. More specifically, an exemplary embodiment of the present invention can be applied to a personal computer, a PDA, a mobile phone terminal, a portable image viewer, and a printer apparatus including a display. An exemplary embodiment of the present invention can also be applied to a digital photo frame, a music player, a game console, an electronic book reader, a tablet terminal, a smartphone, a projection apparatus, and home appliances and vehicle-mounted devices including a display.

According to an exemplary embodiment of the present invention, the user can easily identify the amount of operation. According to an exemplary embodiment of the present invention, erroneous setting values can be prevented from being set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Applications No. 2018-004458, filed Jan. 15, 2018, and No. 2018-004498, filed Jan. 15, 2018, which are hereby incorporated by reference herein in their entirety.

What is claimed is:

1. An electronic apparatus comprising:
a memory and at least one processor and/or at least one circuit to perform the operations of the following units:
a control unit configured to control, in response to a user operating an operation member having a plurality of selectable operation levels associated with a respective control setting, the electronic apparatus according to the respective control setting associated with an operation level;
a setting unit configured to assign a control setting to one or more of the plurality of selectable operation levels of the operation member; and
a display control unit configured to (i) display a setting screen for setting, based on a setting instruction from the user, one or more control settings to be assigned by the setting unit, wherein the setting screen includes (a) items indicating the operation level and the control setting assigned to the operation level and (b) a level display item, (ii) display, in response to the user operating the operation member while the setting screen is displayed, an indicator in the level display item to show the operation level that is being selected by the user operation of the operation member, and (iii) select the operation level by selecting one of the items on the setting screen and change the control setting assigned to the operation level by changing operation.

2. The electronic apparatus according to claim 1, wherein, in response to a second setting operation made by the user while the setting screen is displayed, the setting unit is configured to change the control setting to be assigned to the operation level.

3. The electronic apparatus according to claim 1, wherein, if a given control setting is to be assigned to a first operation level and a third setting operation is made by the user while the setting screen is displayed, the setting unit is configured to switch an assignment of the given control setting from the first operation level to another operation level.

4. The electronic apparatus according to claim 3, wherein, if a selected operation level remains selected for a predetermined time or more on the setting screen, the setting unit is configured to switch the assignment of a control setting from another operation level to the operation level which has remained selected for the predetermined time or more without requiring the third setting operation to be made.

5. The electronic apparatus according to claim 1,
wherein each control setting sets a zoom speed, and
wherein the control unit is configured to control the electronic apparatus, in response to the user operating the operation member, to zoom at the zoom speed set by the control setting associated with the operation level which is selected by the operation of the operation member.

6. The electronic apparatus according to claim 5, further comprising an image sensor,
wherein the control unit is configured to control the electronic apparatus by driving an imaging lens to zoom at the zoom speed set by the control setting associated with the operation level which is selected by the operation of the operation member.

7. The electronic apparatus according to claim 1,
wherein the respective control setting are a plurality of different actions for a displayed character to make, and
wherein the control unit is configured to control the electronic apparatus, in response to the user operating the operation member, to make an action which corresponds to the operation level.

8. The electronic apparatus according to claim 1, wherein the number of operation levels is three or more.

9. The electronic apparatus according to claim 1, wherein the display control unit is configured to display (i) the selected operation level selected by the operation of the operation member while displaying the setting screen and (ii) an illustration of the plurality of selectable operation levels, whereby the selected operation level is displayed in higher resolution than that of the illustrated plurality of selectable operation levels.

10. The electronic apparatus according to claim 9, wherein the display control unit is configured to indicate which of the displayed plurality of selectable operation levels the selected operation level corresponds to.

11. The electronic apparatus according to claim 10, wherein the plurality of selectable operation levels are displayed as areas on the setting screen, whereby each area is ordered in accordance with the order of the operation levels and, in response to the user operating the operation member, the display unit is configured to indicate which operation level is currently being selected by the operation of the operation member by displaying an indicator indicating which of the displayed areas corresponds to the selected operation level.

12. The electronic apparatus according to claim 1,
wherein the operation member is a seesaw-type operation member including a first operation portion and a second operation portion, wherein the first and/or the second operation portions are depressible by the user, and
whereby the different operation levels are selected according to the amount depression of the first operation portion and/or the second operation portion with respect to a reference position.

13. The electronic apparatus according to claim 1, wherein the operation member is any one of: (i) an operation member configured to detect acceleration on the operation member, whereby an amount of acceleration selects the operation level; (ii) an operation member including a horizontally-rotatable operation portion, whereby an amount of horizontal rotation selects the operation level; (iii) an operation member including a vertically-movable operation portion, whereby an amount of vertical movement selects the operation level; and (iv) a three-dimensional (3D) stick, whereby an amount of movement of the stick selects the operation level.

14. A method for controlling an electronic apparatus, the method comprising:
controlling, in response to a user operating an operation member having a plurality of selectable operation levels associated with a respective control setting, the electronic apparatus according to the respective control setting associated with an operation level;
assigning a control setting to one or more of the plurality of selectable operation levels of the operation member;
displaying a setting screen for setting, based on a setting instruction from the user, one or more control settings that are to be assigned, wherein the setting screen includes (a) items indicating the operation level and the control setting assigned to the operation level, and (b) a level display item; and
displaying, in response to the user operating the operation member while the setting screen is displayed, an indicator in the level display item to show the operation level that is being selected by the user operation of the operation member; and
selecting the operation level by selecting one of the items on the setting screen and change the control setting assigned to the selected operation level by changing operation.

15. A computer-readable non-transitory storage medium storing a program for causing a computer to function as the units of the electronic apparatus according to claim 1.

* * * * *